US009046895B2

(12) United States Patent
Orr et al.

(10) Patent No.: US 9,046,895 B2
(45) Date of Patent: Jun. 2, 2015

(54) SYSTEM AND METHOD FOR CONTROLLING FLUID DELIVERY

(75) Inventors: David C. Orr, Dunlap, IL (US); James D. Humphrey, Decatur, IL (US); Peter W. Anderton, Peoria, IL (US); Adam J. Gudat, Chillicoth, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1348 days.

(21) Appl. No.: 12/650,478

(22) Filed: Dec. 30, 2009

(65) Prior Publication Data

US 2011/0160920 A1 Jun. 30, 2011

(51) Int. Cl.

| | |
|---|---|
| ***A01B 79/00*** | (2006.01) |
| ***A01C 23/04*** | (2006.01) |
| ***A01M 7/00*** | (2006.01) |
| ***E02F 9/24*** | (2006.01) |
| ***E21F 5/02*** | (2006.01) |
| ***G05D 7/06*** | (2006.01) |

(52) U.S. Cl.

CPC ............ *G05D 7/0688* (2013.01); *A01B 79/005* (2013.01); *A01C 23/047* (2013.01); *A01M 7/0089* (2013.01); *E02F 9/24* (2013.01); *E21F 5/02* (2013.01)

(58) Field of Classification Search

CPC .. G05D 7/0688; A01B 79/005; A01C 23/048; A01M 7/0014; A01M 7/0089

USPC .............. 700/240, 282, 283; 239/1, 170, 172, 239/225.1, 237, 251, 262, 265.11, 265.19, 239/265.25, 265.35, 722; 250/206.2, 250/559.46

See application file for complete search history.

(56) References Cited

U.S. PATENT DOCUMENTS

| | | | |
|---|---|---|---|
| 3,100,083 | A | 8/1963 | Wardrup |
| 3,344,993 | A | 10/1967 | Wilder et al. |
| 3,529,772 | A | 9/1970 | Brodersen |
| 3,552,658 | A | 1/1971 | Sons |
| 3,782,634 | A | 1/1974 | Herman |
| 3,853,272 | A | 12/1974 | Decker et al. |
| 4,167,247 | A | 9/1979 | Sons et al. |
| 4,380,353 | A | 4/1983 | Campbell et al. |
| 4,487,615 | A | 12/1984 | Taylor et al. |
| 4,803,626 | A | 2/1989 | Bachman et al. |

(Continued)

FOREIGN PATENT DOCUMENTS

| | | |
|---|---|---|
| JP | 2001-303526 | 10/2001 |
| JP | 4107465 B2 | 4/2008 |

OTHER PUBLICATIONS

Mine Inspectorate, Queensland Government, "Excessive Watering of Haul-Roads," Safety Bulletin 94, Jan. 22, 2010.

(Continued)

*Primary Examiner* — Robert Fennema
*Assistant Examiner* — Jennifer L Norton
(74) *Attorney, Agent, or Firm* — Finnegan, Henderson, Farabow, Garrett & Dunner, LLP

(57) ABSTRACT

A systems and methods for delivering fluid to a site using a mobile fluid delivery machine are disclosed. The method includes determining a location of the mobile fluid delivery machine on the site, and determining a fluid delivery rate based on the location of the mobile fluid delivery machine using information related to the site. The method further includes delivering the fluid to a surface of the site at the location of the mobile fluid delivery machine, at the determined fluid delivery rate.

27 Claims, 8 Drawing Sheets

(56) References Cited

U.S. PATENT DOCUMENTS

| | | | | |
|---|---|---|---|---|
| 4,817,870 | A | 4/1989 | Dalton | |
| 4,844,346 | A * | 7/1989 | Coffey | 239/166 |
| 5,134,961 | A | 8/1992 | Giles et al. | |
| 5,518,299 | A | 5/1996 | Adamczyk et al. | |
| 5,837,997 | A * | 11/1998 | Beck et al. | 250/227.11 |
| 5,911,362 | A | 6/1999 | Wood et al. | |
| 5,911,363 | A | 6/1999 | Oligschlager | |
| 5,964,410 | A | 10/1999 | Brown et al. | |
| 6,167,337 | A | 12/2000 | Haack et al. | |
| 6,941,199 | B1 | 9/2005 | Bottomley et al. | |
| 6,954,719 | B2 | 10/2005 | Carter, Jr. et al. | |
| 7,001,444 | B2 | 2/2006 | Small | |
| 7,108,196 | B2 | 9/2006 | Kime | |
| 7,166,841 | B2 * | 1/2007 | Satou et al. | 250/338.1 |
| 7,182,278 | B2 | 2/2007 | Haviland et al. | |
| 7,742,842 | B2 * | 6/2010 | Giles et al. | 700/283 |
| 8,523,085 | B2 * | 9/2013 | Grimm et al. | 700/283 |
| 2004/0195357 | A1 * | 10/2004 | Doherty et al. | 239/172 |
| 2005/0060127 | A1 | 3/2005 | Carter et al. | |
| 2005/0204587 | A1 | 9/2005 | Kime | |
| 2006/0214022 | A1 * | 9/2006 | Caccaviello | 239/172 |
| 2006/0273189 | A1 | 12/2006 | Grimm et al. | |
| 2007/0125558 | A1 | 6/2007 | Embry | |
| 2008/0087305 | A1 | 4/2008 | Cotter | |
| 2008/0114497 | A1 * | 5/2008 | Giles et al. | 700/283 |
| 2009/0224084 | A1 | 9/2009 | Hoisington et al. | |
| 2011/0266357 | A1 * | 11/2011 | Orcutt et al. | 239/1 |
| 2014/0239082 | A1 * | 8/2014 | Freeman et al. | 239/11 |

OTHER PUBLICATIONS

Copending U.S. Appl. No. 12/650,449, filed Dec. 30, 2009, entitled “Mobile Fluid Delivery Control System and Method” (58 pages).

Copending U.S. Appl. No. 12/772,060, filed Apr. 30, 2010, entitled “Methods and Systems for Executing Fluid Delivery Mission” (76 pages).

Copending U.S. Appl. No. 12/772,035, filed Apr. 30, 2010, entitled “Methods and Systems for Controlling Fluid Delivery on a Site” (75 pages).

http://www.hydeneng.com.au/templates/hyden_content.aspx?pageID=3928, “Enviro-spray™ Water Truck Systems,” (2007) (1 page).

U.S. Appl. No. 12/472,415, filed May 27, 2009, entitled “Mobile Fluid Distribution System and Method” (23 pages).

U.S. Appl. No. 12/650,449, filed Dec. 30, 2009, entitled “Mobile Fluid Delivery System and Method” (58 pages).

* cited by examiner

SYSTEM AND METHOD FOR CONTROLLING FLUID DELIVERY

TECHNICAL FIELD

This disclosure relates generally to a system and method for fluid delivery and, more particularly, to a system and method for controlled delivery of a fluid delivery.

BACKGROUND

Work environments associated with certain industries, such as the mining and construction industries, are susceptible to undesirable dust conditions. For example, worksites associated with mining, excavation, construction, landfills, and material stockpiles may be particularly susceptible to dust due to the nature of the materials composing the worksite surface. For example, worksites surfaces of coal, shale, stone, etc. erode easily, and thus may tend to produce significant amounts of dust. Moreover, typical work operations performed at these sites only exacerbate the dust conditions. At a mine site, for example, cutting, digging, and scraping operations may break up the worksite surface, generating dust. In addition, heavy machinery, such as haul trucks, dozers, loaders, excavators, etc., traveling on such sites may disturb settled dust, thereby increasing the dust level of the air.

Undue dust conditions may reduce the efficiency a worksite. For example, dust may impair visibility, interfere with work operations on the site, and require increased equipment maintenance and cleaning. In addition, undue due dust conditions may compromise the comfort, health, and safety of worksite personnel.

Various devices and methods have been used in the past to control work site dust conditions. For example, U.S. Pat. No. 6,954,719 to Carter, Jr. et al. (the '719 patent) discloses a method and system for treating worksite dust conditions. Specifically, the '719 patent discloses a system including one or more dust monitors positioned at different locations around the worksite. The dust monitors monitor the dust levels at their respective locations on the worksite, and generate a dust control signal indicative of the monitored dust level. A controller associated with the system receives the signals from the dust monitors. When the controller determines that the dust level at the location of a particular dust monitor increases above a threshold, the controller sends a signal to dispatch a mobile dust control machine to the location of that dust monitor to treat the dust condition (e.g., spray water and/or dust suppressant).

While the dust control system of the '719 patent may help control dust levels on the worksite, the system may be inefficient in certain ways. For example, the system may not monitor or control the amount of water sprayed on a particular location of the worksite. Accordingly, the system may treat each dust location in the same manner, regardless of the dust level, environmental factors, and other considerations. Thus, dust control resources may be used less efficiently than one would like.

The present disclosure is directed to overcoming one or more disadvantages set forth above and/or other problems in the art.

SUMMARY

One aspect relates to a method for delivering fluid to a site using a mobile fluid delivery vehicle. The method may include determining a location of the mobile fluid delivery machine on the site, and determining a fluid delivery rate based on the location of the mobile fluid delivery machine using information related to the site. The method may further include delivering the fluid to a surface of the site at the location of the mobile fluid delivery machine, at the determined fluid delivery rate.

Another aspect relates to a mobile fluid delivery machine for delivering fluid to a site. The mobile fluid delivery machine may include a location device configured to determine a location of the mobile fluid delivery machine on the site, a site database storing information related to the site, and a flow controller. The flow controller may be configured to determine a fluid delivery rate based on the location of the mobile fluid delivery machine on the site using the information related to the site, and to generate a flow control signal based on the determined fluid delivery rate. The fluid delivery machine may further include a fluid delivery system configured to spray the fluid on a surface of the site at the determined fluid delivery rate based on the flow control signal.

Another aspect relates to another method for delivering fluid to a site using a mobile fluid delivery machine. The method may receiving a location of the mobile fluid delivery machine on the site, determining a fluid delivery rate based on the location of the mobile fluid delivery machine using information related to the site, and generating a flow control signal based on the determined fluid delivery rate. The method may further include sending the flow control signal to the mobile fluid delivery machine.

Yet another aspect relates to a fluid delivery system for delivering fluid to a site using a mobile fluid delivery machine. The system may include a communication device for receiving a signal indicative of a location of the mobile fluid delivery machine on the site, a site database storing information related to the site, and a flow controller. The flow controller may be configured to determine a fluid delivery rate based on the location of the mobile fluid delivery machine on the site using the information related to the site, to generate a flow control signal based on the determined fluid delivery rate, and to send the flow control signal to the mobile fluid delivery machine via the communication device.

DETAILED DESCRIPTION

Figure 1:
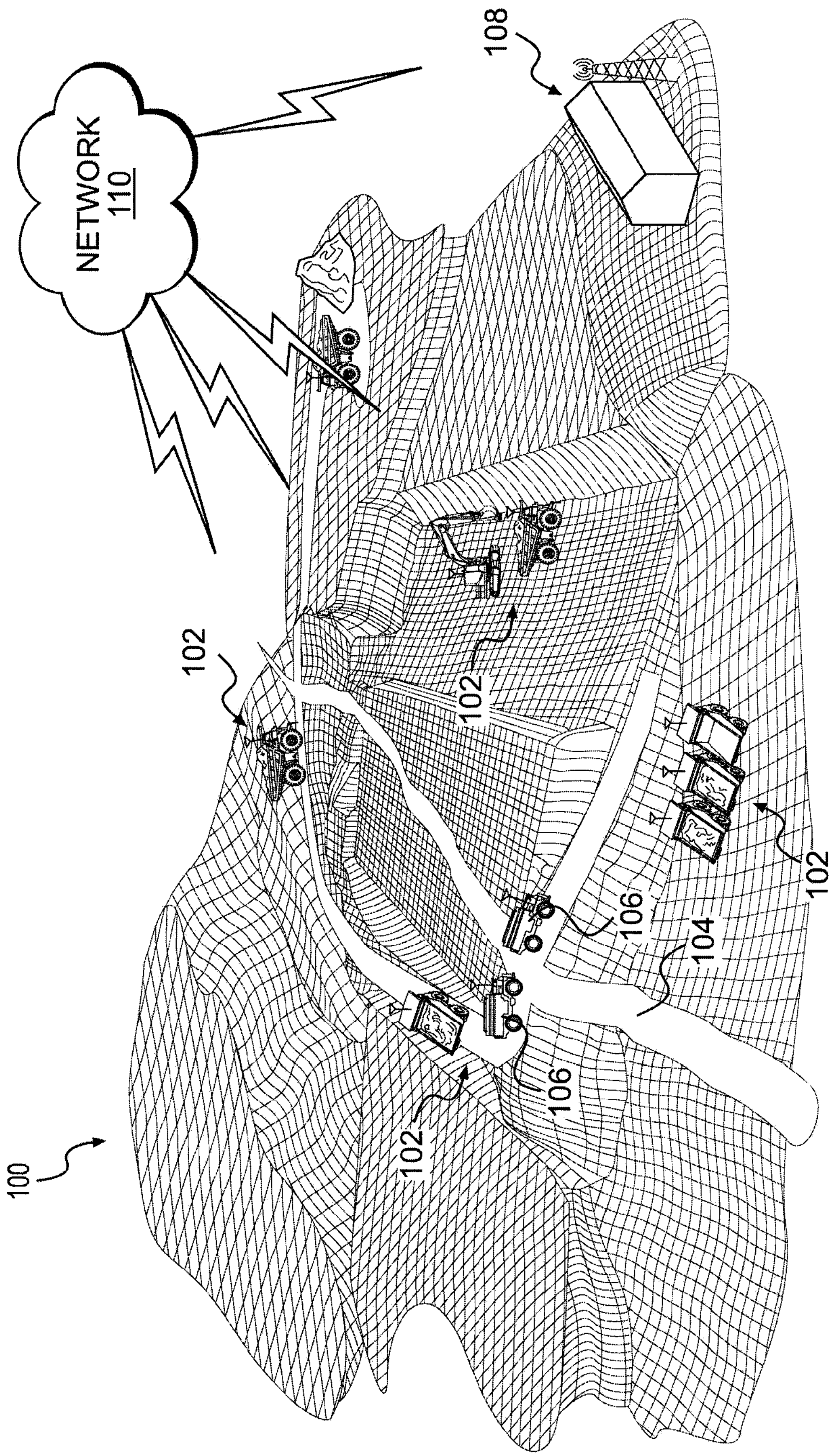
FIG. 1 is a representation of an exemplary worksite on which the disclosed fluid delivery processes may be employed.

FIG. 1 illustrates an exemplary worksite 100 on which the disclosed fluid delivery processes may be employed. In one environment, worksite 100 may comprise a surface mine site at which mining operations generate significant dust levels that create difficult conditions for worksite personnel. For example, the dust may impair visibility, reduce air quality, require frequent equipment maintenance and cleaning, or otherwise hinder operations worksite 100. It is to be appreciated, however, that worksite 100 may alternatively include a construction site, a landfill, a war zone, an underground worksite, or any other type of worksite at which undesired dust conditions may arise.

As shown in FIG. 1, a variety of mobile machines 102 may operate on worksite 100. Mobile machines 102 may include any combination of autonomous (i.e., unmanned) machines, semi-autonomous machines, or operator-controlled machines. Mobile machines 102 may include, for example, off-highway haul trucks, articulated trucks, excavators, loaders, dozers, scrapers, or other types of earth-working machines for excavating or handling material from associated with worksite 100. In connection with various work operations, mobile machines 102 may travel along haul roads 104 or other paths between excavation locations, dumping areas, and other destinations on worksite 100. Aside from earth-working machines and other such heavy equipment, mobile machines 102 may also include one or more mobile fluid delivery machines 106. Fluid delivery machines 106 may be configured to travel worksite 100 along haul roads 104 and to deliver fluid (e.g., water and/or dust suppressant) to the surface of worksite 100 to control dust levels. In connection with their various operations, mobile machines 102 may communicate with one another, and with a worksite control facility 108, over a network 110.

Figure 2:
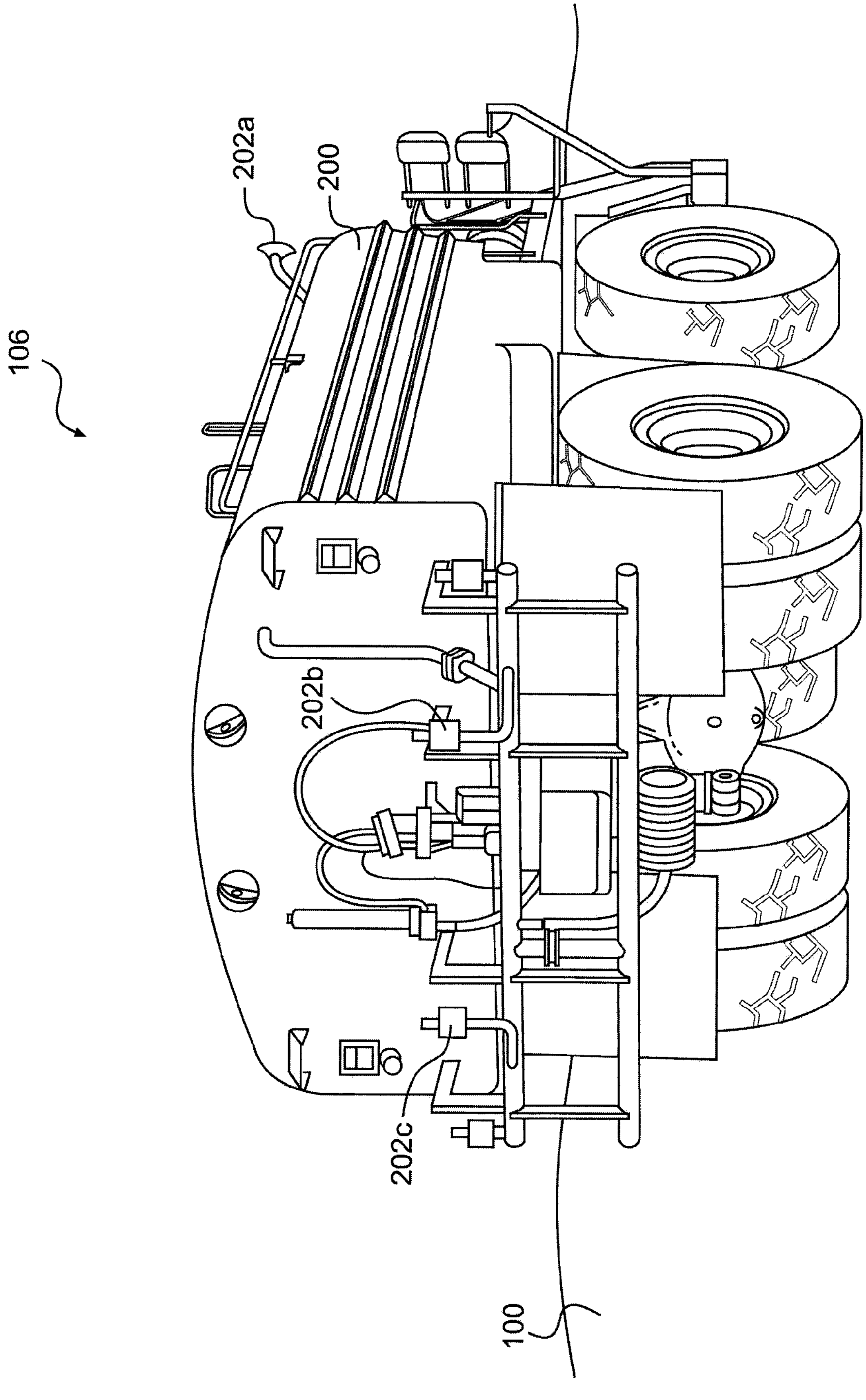
FIG. 2 is a representation of an exemplary mobile fluid delivery machine, consistent with the disclosed embodiments.

FIG. 2 illustrates an exemplary mobile fluid delivery machine 106, consistent with the disclosed embodiments. In one embodiment, fluid delivery machine 106 may be an off-highway truck converted for use to deliver fluid. For example, fluid delivery machine 106 may be fitted with, among other things, a fluid tank 200 configured to store fluid (e.g., water); a variety of piping, hoses, pumps, and valves; and one or more spray heads 202 configured to spray the fluid onto the surface of worksite 100 as fluid delivery machine 106 travels about worksite 100, thereby controlling dust conditions on worksite 100. Spray heads 202 will be discussed in further detail below with respect to FIG. 4. It is to be appreciated that the disclosed fluid delivery machine 106 may alternatively comprise another type of mobile machine set up to distribute water or other fluids in a wide variety of applications. For example, fluid delivery machine 106 may embody a tractor towing a trailer equipped with a tank and configured to distribute chemicals, water, or other materials (e.g., pesticide, fertilizer, etc.) in an agricultural setting; an on-highway truck configured to spray a saline solution on roads, runways, or parking lots to melt snow and ice; or another type of vehicle configured to deliver fluid in other another environment.

Figure 3:
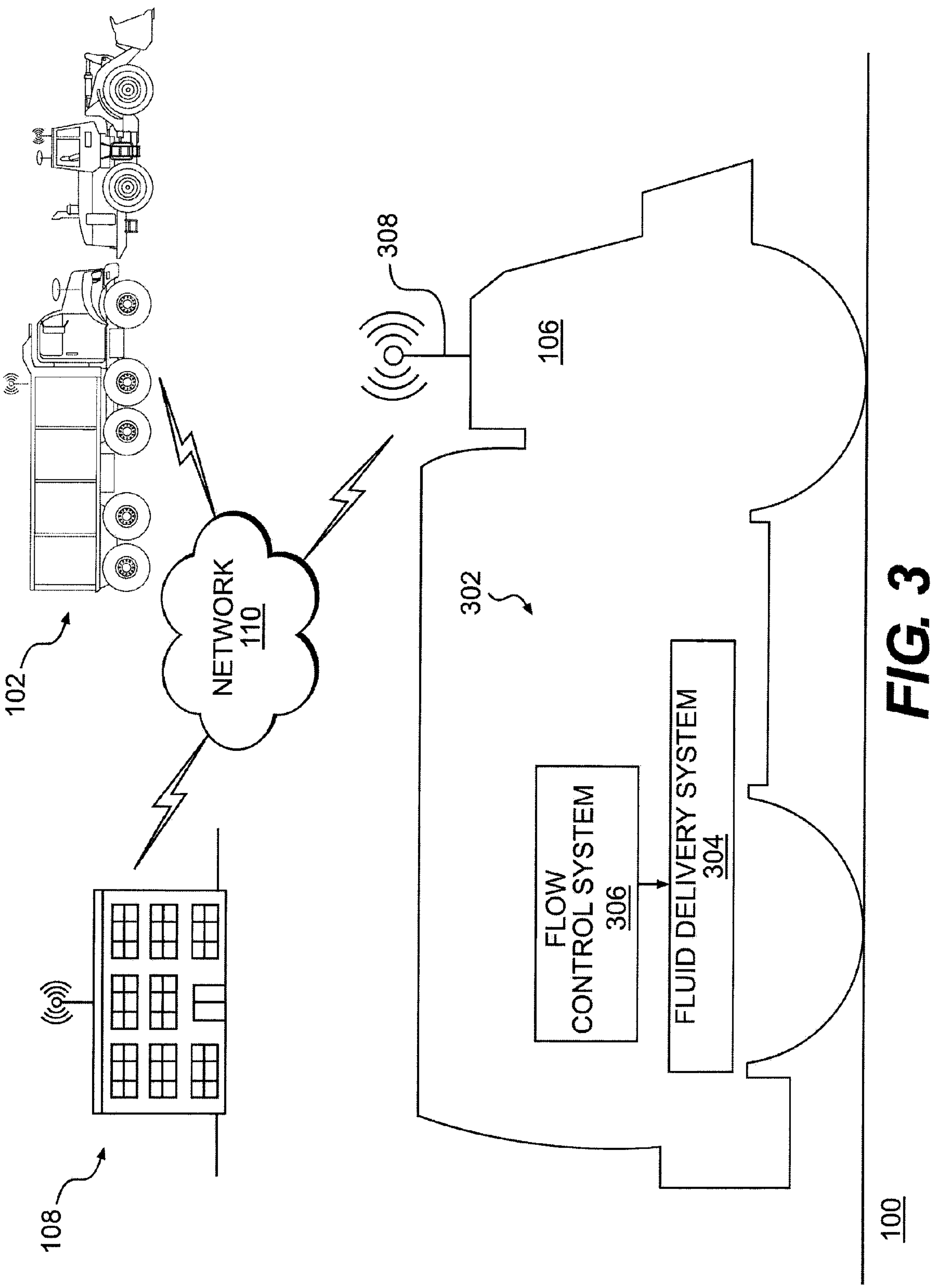
FIG. 3 is a representation of an exemplary fluid delivery control system associated with the mobile fluid delivery machine of FIG. 2, consistent with the disclosed embodiments.

FIG. 3 illustrates an exemplary fluid delivery control system 302, consistent with the disclosed embodiments. For purposes of illustration, fluid delivery control system 302 is described as applied to fluid delivery machine 106 (e.g., an off-highway truck set up for use as a water truck at a mining or construction site). As noted above, however, fluid delivery control system 302 may be applicable in a variety of other scenarios. As shown in FIG. 3, fluid delivery control system 302 may include a fluid delivery system 304 and a flow control system 306 for distributing fluid, such as water, on the surface of worksite 100 to alleviate dust conditions. Onboard fluid delivery control system 302 may communicate with worksite control facility 108 and with other mobile machines 102 via network 110 using a communication device 308 (e.g., an antenna).

Fluid delivery system 304, as discussed below, may be configured to distribute fluid (e.g., water) on the surface of worksite 100 at a rate commanded by flow control system 306. Flow control system 306, as discussed below, may be configured to determine an appropriate fluid delivery rate (e.g., in liters per square meter per hour) and spray width or distribution under the circumstances, and to output a desired flow rate signal commanding fluid delivery system 304 to output fluid on the worksite surface at the determine rate and distribution.

Figure 4:
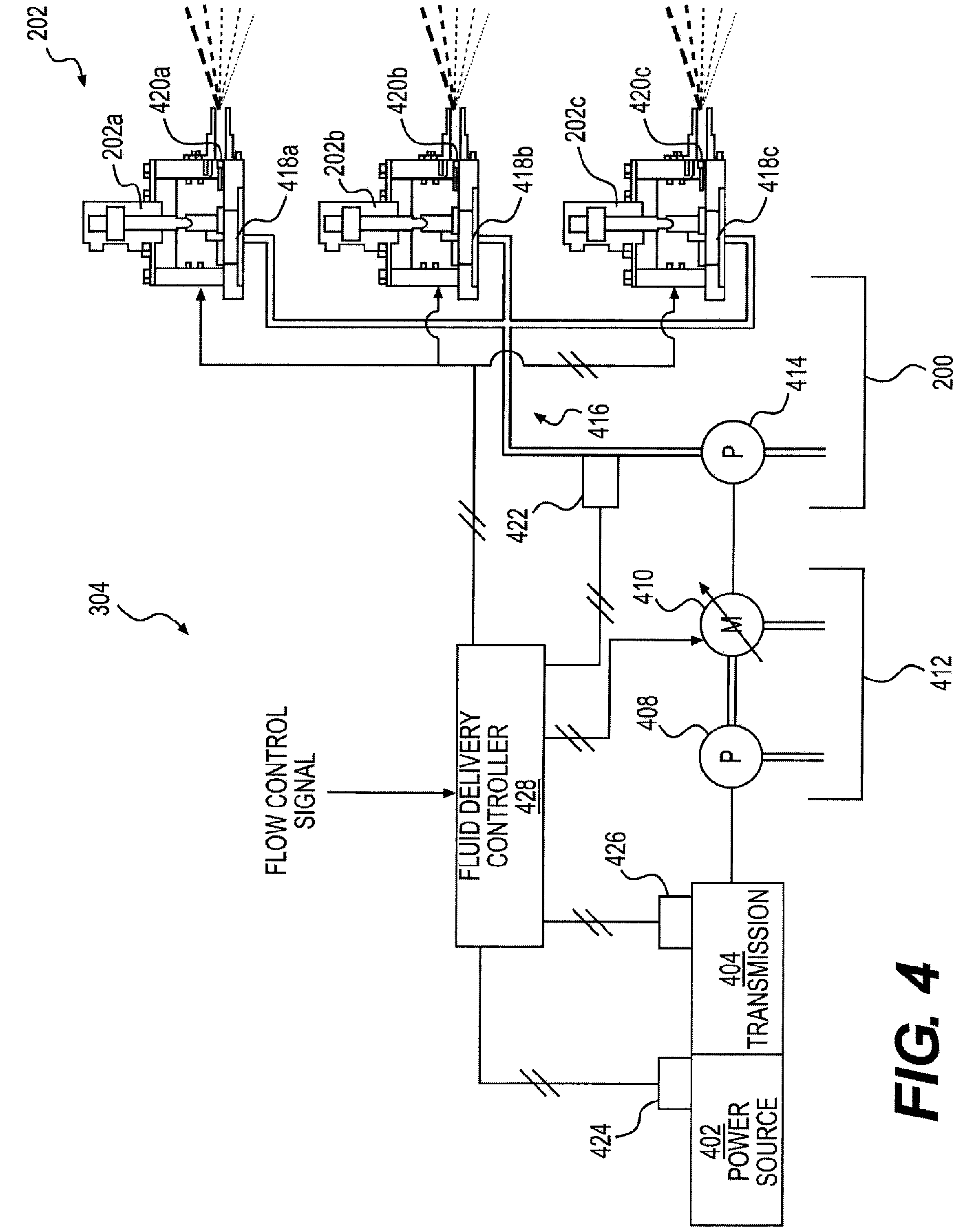
FIG. 4 is a representation of an exemplary fluid delivery system associated with the fluid delivery control system of FIG. 3, consistent with the disclosed embodiments.

FIG. 4 illustrates a representation of fluid delivery system 304 in greater detail. As shown, fluid delivery system may include a power source 402 (e.g., an engine) configured to supply power to propel fluid delivery machine 106, to power fluid delivery system 304, and/or to power other systems onboard fluid delivery machine 106. That is, the power from power source 402 may be used for purposes other than for providing motive power for fluid delivery machine 106. For example, an off-highway truck, prior to being adapted for fluid delivery applications, may have been designed to use power from power source 402 for auxiliary applications, such as raising and lowering a truck bed. Power source 402 may include, for example, a combustion engine, an electric motor, a combustion engine-electric hybrid system, or another type of power source known in the art.

Fluid delivery system 304 may also include a transmission 404 coupled to receive power from power source 402. Transmission 404 may comprise a manual step transmission, an automatic step transmission, an automatic continuously-variable transmission, or any other type of transmission known in the art. Transmission 404 may receive the power output from power source 402, convert a torque of the power output based on a selected transmission ratio (e.g., gear), and couple the converted power to one or more traction devices (not shown) (e.g., wheels, tracks, treads, etc.) to propel fluid delivery machine 106. In addition, transmission 404 may couple some of the converted power for fluid delivery, as discussed below.

Fluid delivery system 304 may include a hydraulic pump 408 and a hydraulic motor 410. In one embodiment, pump 408 may be a fixed-displacement pump and motor 410 may be a variable-displacement motor. For example, an off-highway truck adapted for use as a water truck may have an existing fixed-displacement pump 408 already in place for purposes other for than delivering fluid to worksite 100. Adding a variable-displacement motor 410 may offer advantages in controlling the amount of fluid distributed, for example, by enabling control of fluid flow regardless of engine speed or ground speed. In this manner, fixed displacement pump 408 may still be used for applications other than fluid delivery without being affected by changes in fluid delivery parameters. For example, pump 408 may drive motor 410, and may also use this fluid for cooling brake components (not shown). The brake cooling system may not be affected by load changes from fluid delivery system 304. In alternative embodiments, pump 408 and motor 410 may comprise other suitable combinations of fixed- and/or variable-displacement devices, such as a variable-displacement pump 408 and a fixed-displacement motor 410, or a variable-displacement pump 408 and a variable-displacement motor 410. Alternatively, instead of pump 408 and motor 410, and other type of open- or closed-loop hydrostatic system may be employed.

Continuing with FIG. 4, an input of pump 408 may be mechanically or otherwise coupled to transmission 404 to receive the converted power output of power source 402. An output of pump 408, in turn, may be hydraulically coupled to an input of hydraulic motor 410 via well-known hydraulic means. The converted power output may drive pump 408 to pump hydraulic fluid from a hydraulic tank 412 through the output of pump 408, thereby driving motor 410. Motor 410, in turn, may receive the pumped hydraulic fluid from pump 408 to drive a mechanical output, and may return the spent hydraulic fluid to hydraulic tank 412. An output of motor 410 may be mechanically coupled to drive a fluid pump 414. In one embodiment, fluid pump 414 may be a fixed-displacement pump. But one of ordinary skill in the art will appreciate that a variable-displacement pump 414 may be utilized instead, if desired. In addition, other configurations may be used. For example, pump 408 and motor 410 may be omitted, and a variable-displacement fluid pump 414 may be coupled directly to transmission 404.

As shown in FIG. 4, pump 414 may be fluidly coupled to fluid tank 200 (e.g., a water tank) (FIG. 2), one or more spray heads 202 (FIG. 2), one or more hose reels, and/or a water cannon (not shown) a by way of fluid lines 416. Pump 414, driven by motor 410, may draw fluid (e.g., water) from fluid tank 200 and deliver the fluid to spray heads 202 via fluid lines 416. The hose reels and water cannon may be used for dust control and/or for firefighting at worksite 100.

Spray heads 202, in turn, may spray the fluid onto the surface of worksite 100, thereby hydrating the worksite surface and controlling dust conditions on worksite 100. Spray heads 202 may each include an inlet passage 418 for receiving the fluid from fluid lines 416. Spray heads 202 may also each include an output orifice 420 through which the fluid is sprayed onto worksite 100. Although the particular configuration of spray heads 202 is not material to the disclosure, in one embodiment, spray heads 202 may comprise the spray heads described in U.S. application Ser. No. 12/472,415, which is incorporated herein by reference in its entirety. It is to be appreciated, however, that any type of spray head 202 may be used without departing from the sprit and scope of the disclosure.

In the example shown in FIG. 4, three (3) spray heads 202 are illustrated. As shown in FIG. 2, a first spray head 202*a* may be located toward the front of fluid delivery machine 106, and arranged to spray to the left and/or right of fluid delivery machine 106 with respect to a direction of travel. A second spray head 202*b* may be located to the right and rear of fluid delivery machine 106, and arranged to spray behind and to the right of fluid delivery machine 106 with respect to the direction of travel A third spray head 202*c* may be located to the left and rear of fluid delivery machine 106, and arranged to spray behind and to the left of fluid delivery machine 106 with respect to the direction of travel. It is to be appreciated, however, that any number of spray heads 202 may be utilized. Moreover, spray heads 202 may be mounted on fluid delivery machine 106 at any desired location or orientation to provide suitable coverage of worksite 100. In one embodiment, spray heads 202 may be positioned as to provide a desired spray pattern having a width suitable to cover a predetermined surface area of worksite 100, such as a portion of a typical mine haul road, without having the various sprays overlap.

Although FIG. 4 illustrates spray heads 202 as connected by common fluid lines 416, spray heads 202 may be independently controllable. For example, orifices 420 may be continuously-variable between a fully-closed position and a fully-open position. Alternatively, orifices 420 may be capable of only being fully-closed or fully-opened. In addition, orifices 420 may be controlled to vary the width or distribution of the spray (i.e., the spread) at least in a direction perpendicular to the direction of travel of fluid delivery machine 106. In one embodiment, for example, orifices 420 may be controlled to provide a narrow spray, a medium-width spray, a wide spray, or a spray continuously-variable between a narrow spray and a wide spray. In this manner, haul roads 104 of varying widths may be treated.

Continuing with FIG. 4, fluid delivery system 304 may further include a variety of sensors configured to sense various operational parameters of fluid delivery system 304. For example, fluid delivery system 304 may include, among other sensors, a fluid pressure sensor 422, a power source speed sensor 424, and a transmission sensor 426.

Fluid pressure sensor 422 may be located to sense a pressure of the fluid in fluid lines 416. Alternatively, fluid pressure sensor 422 may be positioned to sense a pressure of the fluid exiting pump 414. In either case, fluid pressure sensor 422 may output a signal indicative of a value of the sensed pressure (e.g., in psi). Fluid pressure sensor 422 may comprise, for example, a capacitive pressure sensor, an electromagnetic pressure sensor, a piezoresistive strain gauge pressure sensor, a piezoelectric pressure sensor, an optical pressure sensor, a potentiometric pressure sensor, or any other type of pressure sensor known in the art.

Power source speed sensor 424 may be positioned to sense a rotational speed of power source 402 (e.g., the rotational speed of an output shaft). Power source speed sensor 424 may output a signal indicative of a value of the speed of power source 402 (e.g., in RPM). Power source speed sensor 424 may comprise any type of tachometer or other rotational speed sensor known in the art.

Transmission sensor 426 may include one or more devices located to sense one or more operational parameters of transmission 404. For example, transmission sensor 426 may sense a state of transmission 404, such as whether transmission 404 is in forward, reverse, or neutral, as well as a torque-to-speed ratio (e.g., gear) of transmission 404. Transmission sensor 426 may also sense a rotational output speed of transmission 404. Transmission sensor 416 may output one or more signals indicative of values of one or more of these sensed parameters.

Any of the above sensors 422-426 may be configured to directly sense a desired parameter, to sense one or more secondary parameters and derive a value for the desired parameter, or to determine a value for the desired parameter by some other indirect means. Operation of sensors 422-426 is well known in the art and will not be described further.

Fluid delivery system 304 may further include a fluid delivery controller 428 configured to control operations of fluid delivery system 304. Fluid delivery controller 428 may embody, for example, a general microprocessor capable of controlling numerous functions of fluid delivery system 304 (e.g., an electronic control module). Fluid delivery controller 428 may include a memory, a secondary storage device, a processor (e.g., a CPU), or any other components for running programs for performing the disclosed functions of fluid delivery system 304. Various other circuits may be associated with fluid delivery controller 428, such as power supply circuitry, signal conditioning circuitry, data acquisition circuitry, signal output circuitry, signal amplification circuitry, and other types of circuitry known in the art.

As shown in FIG. 4, fluid delivery controller 428 may communicate with sensors 422-426, and may be controllably connected to pump 408, motor 410, and/or spray heads 202. Fluid delivery controller 428 may receive the signals from fluid pressure sensor 422, power source speed sensor 424, and transmission sensor 426. Fluid delivery controller 428 may also communicate with flow control system 306 (FIG. 3) to receive a flow control signal. The flow control signal may indicate a fluid delivery rate $R_{Delivery}$ (e.g., in liters square meter per hour) at which flow control system 306 commands fluid delivery system 304 to output fluid from spray heads 202. The signal may further indicate which of spray heads 202 are to be turned on (i.e., operating to spray fluid), the relative allocation (e.g., as percentages) of the overall fluid delivery rate $R_{Delivery}$ among spray heads 202, and a desired spray width or distribution (e.g., narrow, medium, or wide). In one embodiment, an exemplary flow control signal may include the following parameters:

<$R_{Delivery}$, Delivery $Amount_{Head1}$, $Distribution_{Head1}$, Delivery $Amount_{Head2}$, $Distribution_{Head\ 2}$, Delivery $Amount_{Head3}$, $Distribution_{Head3}$, . . . >, where $R_{Delivery}$ indicates the overall fluid delivery rate commanded by flow control system 306 (e.g., in liters per square meter per hour), Delivery $Amount_{Head1}$ indicates the portion of the fluid delivery rate allocated to spray head 202*a* (e.g., 33%), $Distribution_{Head1}$ indicates the width or distribution of the spray for spray head 202*a* (e.g., narrow, medium, or wide), Delivery $Amount_{Head2}$ indicates the portion of the fluid delivery rate allocated to spray head 202*b* (e.g., 33%), $Distribution_{Head2}$ indicates the width or distribution of the spray for spray head 202*b* (e.g., narrow, medium, or wide), Delivery $Amount_{Head3}$ indicates the portion of the fluid delivery rate allocated to spray head 202*c* (e.g., 33%), and $Distribution_{Head3}$ indicates the width or distribution of the spray for spray head 202*c* (e.g., narrow, medium, or wide). It is to be appreciated, however, that the flow control signal may be modified to accommodate more or less spray heads 202, or to include different or additional fluid delivery parameters, if desired.

Based on known characteristics of fluid delivery system 304, fluid delivery controller 428 may set orifices 420 to spray fluid in the amount and with the distribution or width (e.g., narrow, medium, or wide) commanded by the flow control signal. For example, fluid delivery controller 428 may control orifice 420*a* to provide one-third of the total desired flow as a "wide" spray, orifice 420*b* to provide one-third of the total desired flow as a "wide" spray, and orifice 420*c* to provide the remaining one-third of the total desired flow as a "medium" width spray.

Fluid delivery controller 428 may then determine a corresponding internal fluid pressure required of fluid delivery system 304 to maintain the fluid delivery rate $R_{Delivery}$ indicated by the flow control signal. For example, the memory of fluid delivery controller 428 may store one or more lookup tables mapping various fluid delivery rates $R_{Delivery}$, to corresponding internal pressures of fluid delivery system 304 (i.e., the pressure in fluid lines 416 or at the output of pump 414 indicated by the signal from fluid pressure sensor 422) for the various possible settings of spray head orifices 420. Upon determining the appropriate pressure of fluid delivery system 304, fluid delivery controller 428 may determine an appropriate displacement of variable-displacement motor 410 (and/or pump 408) to maintain that pressure. For example, the memory of fluid delivery controller 428 may further store one or more lookup tables mapping various output speeds of power source 402 and/or of transmission 404 and various pressures of fluid delivery system 304 to corresponding displacement values for variable-displacement motor 410. (and/or pump 408) Upon determining the appropriate displacement for motor 410 (and/or pump 408), fluid delivery controller 428 may responsively control motor 410 (and/or pump 408) to hold that displacement, thereby maintaining the desired fluid delivery rate. Alternatively or additionally, fluid delivery controller 428 may use the above-referenced information to responsively control spray head orifices 420 to maintain the fluid delivery rate $R_{Delivery}$.

Figure 5:
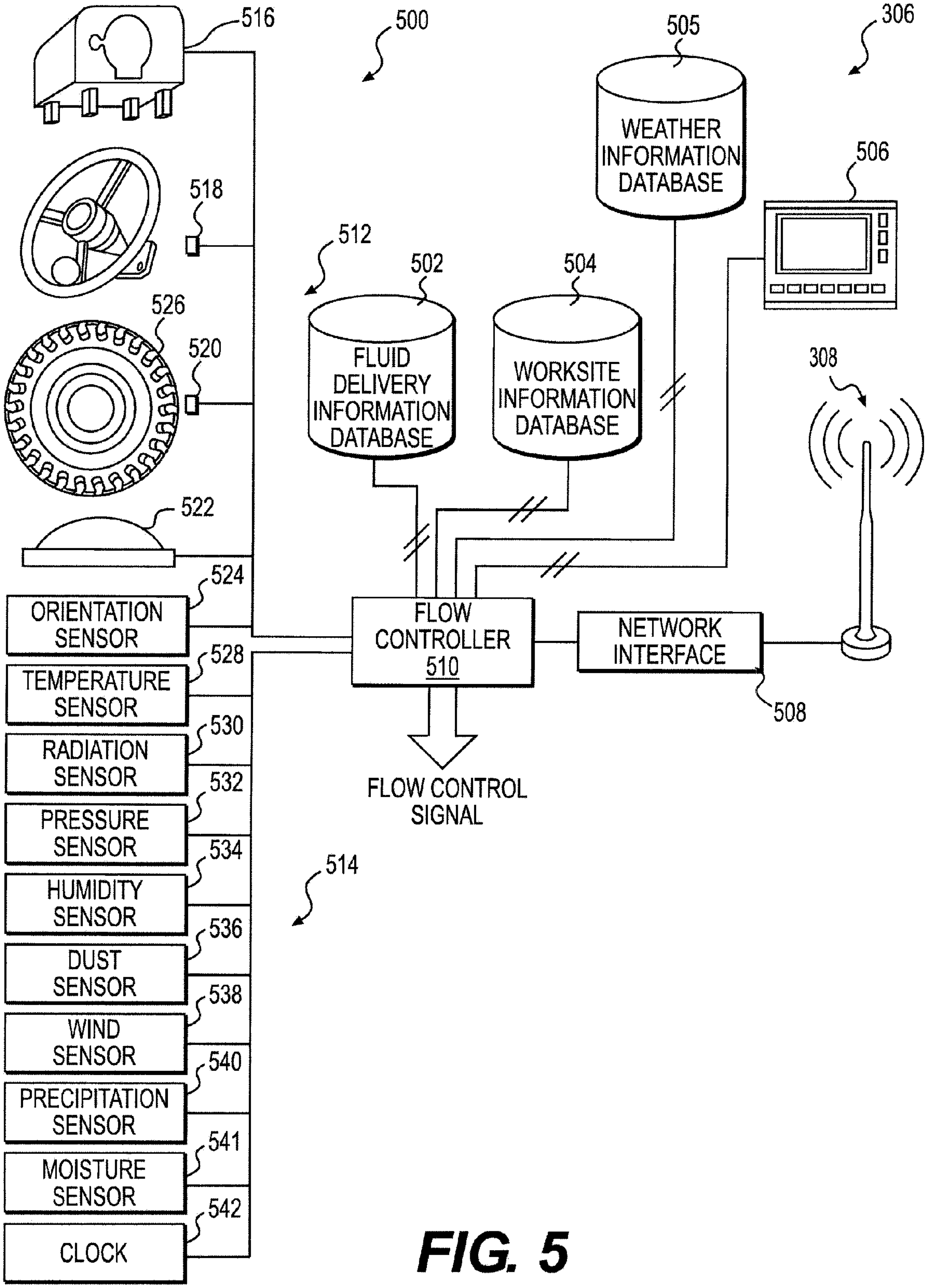
FIG. 5 is a representation of an exemplary flow control system associated with the fluid delivery control system of FIG. 3, consistent with the disclosed embodiments.

FIG. 5 illustrates a representation of flow control system 306 in greater detail. As shown, flow control system 306 may include a sensing system 500, a fluid delivery information database 502, a worksite information database 504, a weather information database 505, an operator interface 506, and a network interface 508 in communication with a flow controller 510. Sensing system 500 may include a variety of devices for sensing different parameters in connection with the disclosed fluid delivery processes. In one embodiment, sensing system 500 may include both a machine operation sensing system 512 and an environmental sensing system 514.

Machine operation sensing system 512 may include a variety of sensing devices for sensing different operational parameters of fluid delivery machine 106 in connection with the disclosed fluid delivery processes. For example, machine operation sensing system 512 may include a machine vision device 516, a steering angle sensor 518, a traction device speed sensor 520, a machine location device 522, and a machine orientation sensor 524.

Machine vision device 516 may include a device positioned on fluid delivery machine 106 and configured to detect a range and a direction to points on the surface of worksite 100 (e.g., objects) within a field of view of machine vision device 516. Machine vision device 516 may comprise a LIDAR (light detection and ranging) device, a RADAR, (radio detection and ranging) device, a SONAR (sound navigation and ranging) device, a camera device, or any other type of device that may detect a range and a direction to points on the surface of worksite 100. Machine vision device 516 may, in real-time or periodically, generate and communicate to flow controller 510 a signal indicative of the range and the direction to the points on the surface of worksite 100 for use in the disclosed fluid delivery processes, as discussed below. In one aspect, as fluid delivery machine 106 travels about worksite 100, machine vision device 516 may be used to detect objects on the surface of worksite (e.g., other mobile machines 102, worksite personnel, worksite infrastructure, etc.) to determine whether fluid delivery should be halted or modified. For example, it may be desirable to halt or modify fluid delivery when a service vehicle, another machine 102, equipment, or a worker is detected nearby fluid delivery machine 106 to prevent such objects from being sprayed with fluid.

Moreover, machine vision device 516 may be used to monitor spray heads 202 to determine whether fluid delivery system 304 is functioning properly. For example, one or more machine vision devices 516 may be positioned to monitor the fluid sprayed from spray heads 202. If machine vision device 516 detects less than an expected amount of fluid sprayed from spray heads 202 (e.g., no fluid is sprayed from a spray head 202 when the spray head should be spraying some fluid), it may be determined that fluid delivery system 304 is not functioning properly. Based on such a determination, one or more corrective actions may then be taken. For example, fluid delivery system 304 may enter a diagnostic mode whereby spray heads 202, fluid lines 416, or other elements of fluid delivery system 304 are purged (e.g., to remove a clog).

Steering angle sensor 518 may include any device configured to sense or otherwise determine a steering angle of fluid delivery machine 106. Steering angle sensor 518 may, in real-time or periodically, generate and communicate to flow controller 510 a signal indicative of the determined steering angle for use in the disclosed fluid delivery processes, as discussed below. For example, it may be desirable to reduce or modify fluid delivery when fluid delivery machine 106 is traveling through a curved section of haul road 104.

Traction device speed sensor 520 may include any device configured to determine the speed of one or more traction devices 526 (e.g., wheels) of fluid delivery machine 106. Traction device speed sensor 520 may, in real-time or periodically, generate and communicate to flow controller 510 a signal indicative of the determined speed of traction devices 526 for use in the disclosed fluid delivery processes, as discussed below.

Machine location device 522 may include any device configured to determine a real-time location of fluid delivery machine 106 on worksite 100. Location device 522 may receive and analyze high-frequency, low-power radio or laser signals from multiple locations to triangulate a relative location (e.g., in latitude and longitude) of fluid delivery machine 106. For example, location device 522 may comprise an electronic Global Positioning System (GPS) receiver, a Global Navigation Satellite Systems (GNSS) receiver, or another type of receiver configured to receive signals from one or more satellites and to determine the location of fluid delivery machine 106 based on the signals. Alternatively or additionally, machine location device 522 may comprise a local radio or laser system configured to receive a signal from one or more transmission stations, and to determine a relative 2-D or 3-D location of fluid delivery machine 106 with respect to known locations of the transmission stations. Alternatively or additionally, location device 522 may include an Inertial Reference Unit (IRU), an odometric or dead-reckoning positioning device, or another known locating device operable to receive or determine a relative 2-D or 3-D location of fluid delivery machine 106 in real-time. Location device 522 may, in real-time or periodically, generate and communicate to flow controller 510 a signal indicative of the location of fluid delivery machine 106 on worksite 100 (e.g., in latitude and longitude) for use in the disclosed fluid delivery processes, as discussed below.

Machine orientation sensor 524 may include any device configured to determine a heading and inclination (i.e., orientation) of fluid delivery machine 106 on the surface of worksite 100. For example, orientation sensor 524 may include a laser-level sensor, a tilt sensor, inclinometer, a radio direction finder, a gyrocompass, a fluxgate compass, or another known device operable to determine a relative pitch, yaw, and/or roll of fluid delivery machine 106 as it travels about worksite 100. It is to be appreciated that the combination of the components of pitch, yaw, and roll of fluid delivery machine 106 may indicate the relative slope or inclination of the surface of worksite 100 at the location of fluid delivery machine 106. Orientation sensor 524 may, in real-time or periodically, generate and communicate to flow controller 510 a signal indicative of a heading and inclination of fluid delivery machine 106 for use in the disclosed fluid delivery processes, as discussed below.

Continuing with FIG. 5, environmental sensing system 514 may include a variety of sensing devices for sensing different "weather" or "environmental" parameters associated with worksite 100, in connection with the disclosed fluid delivery processes. For example, environmental sensing system 514 may include an ambient temperature sensor 528, a solar radiation sensor 530, an atmospheric pressure sensor 532, a humidity sensor 534, a dust sensor 536, a wind sensor 538, a precipitation sensor 540, a moisture sensor 541, and a clock 542.

Temperature sensor 528 may include any device (e.g., positioned on fluid delivery machine 106 or at a stationary location on or near worksite 100) configured to sense an ambient temperature of worksite 100. For example, temperature sensor 528 may comprise an analog or digital temperature sensor, a resistance temperature detector (RTD), a thermocouple, a thermowell, or any other type of temperature sensor known in the art. Temperature sensor 528 may, in real-time or periodically, generate and communicate to flow controller 510 a signal indicative of a value of the sensed ambient temperature (e.g., in degrees Celsius, Fahrenheit, or Kelvin) of worksite 100 for use in the disclosed fluid delivery processes, as discussed below.

Radiation sensor 530 may include any device (e.g., positioned on fluid delivery machine 106 or at a stationary location on or near worksite 100) configured to sense an intensity of solar radiation at worksite 100. For example, radiation sensor 530 may comprise a pyranometer, a net radiometer, a quantum sensor, an actinometer, a bolometer, a thermopile, a photodiode, or any other known device for sensing broadband solar radiation flux density. Radiation sensor 530 may, in real-time or periodically, generate and communicate to flow controller 510 a signal indicative of a value of the sensed intensity of solar radiation (e.g., in watts per square meter) for use in the disclosed fluid delivery processes, as discussed below.

Pressure sensor 532 may include any device (e.g., on fluid delivery machine 106 or positioned somewhere on worksite 100) configured to sense an atmospheric pressure of worksite 100. Pressure sensor 532 may include a barometer sensor, such as a capacitive pressure sensor, an electromagnetic pressure sensor, a piezoresistive strain gauge pressure sensor, a piezoelectric pressure sensor, an optical pressure sensor, a potentiometric pressure sensor, or any other type of atmospheric pressure sensor known in the art. Pressure sensor 532 may, in real-time or periodically, generate and communicate to flow controller 510 a signal indicative of a value of the sensed atmospheric pressure (e.g., in atms) for use in the disclosed fluid delivery processes, as discussed below.

Humidity sensor 534 may include any device (e.g., positioned on fluid delivery machine 106 or at a stationary location on or near worksite 100) configured to sense the humidity at worksite 100. For example, humidity sensor 534 may comprise an electric hygrometer, a hair tension hydrometer, a psychrometer, or any other device known in the art for sensing humidity. Humidity sensor 534 may, in real-time or periodically, generate and communicate to flow controller 510 a signal indicative of a value of the sensed humidity (e.g., in mass of water per unit volume of air) for use in the disclosed fluid delivery processes, as discussed below.

Dust sensor 536 may include any device (e.g., positioned on fluid delivery machine 106 or at a stationary location on or near haul road 104) configured to determine a dust condition or a dust level of the air at the particular location of dust sensor 536, or a relative overall dust level for worksite 100. For example, dust sensor 536 may collect an air sample, pass a constant-intensity light beam from a light source through the air and toward a light sensor, and measure the magnitude of light transmission interference between the light source and the light sensor. Dust sensor 536 may determine the concentration of the dust in the air based on the magnitude of the interference. Dust sensor 536 may, in real-time or periodically, generate and communicate to flow controller 510 a signal indicative of a value of the concentration of dust in the air (e.g., in parts per million) for use in the disclosed fluid delivery processes, as discussed below. It should be appreciated that alternative or additional types of dust monitoring devices or methods known in the art may be used.

Wind sensor 538 may include any device (e.g., positioned on fluid delivery machine 106 or at a stationary location on or near worksite 100) configured to determine a speed and a direction of the wind on worksite 100. For example, wind sensor 538 may comprise a velocity anemometer, such as a laser Doppler anemometer, a sonic anemometer, a hot-wire anemometer, or a turbine anemometer; a pressure anemometer, such as a plate anemometer or a tube anemometer; or any other type of wind sensor known in the art. Wind sensor 538 may, in real-time or periodically, generate and communicate to flow controller 510 a signal indicative of values of the sensed wind speed and direction (e.g., 4 km/h NW) to flow controller 510 for use in the disclosed fluid delivery processes, as discussed below.

Precipitation sensor 540 may include any device (e.g., positioned on fluid delivery machine 106 or at a stationary location on or near worksite 100) configured to determine an amount or rate of precipitation on worksite 100. For example, precipitation sensor 540 may comprise a rain switch, a precipitation gauge, or any other type of precipitation-sensing device known in the art. Precipitation sensor 540 may, in real-time or periodically, generate and communicate to flow controller 510 a signal indicative of a value of the amount or rate of precipitation on worksite 100 for use in the disclosed fluid delivery processes, as discussed below.

Moisture sensor 541 may include any device configured to determine a moisture content (e.g., volumetric water content) of the surface of worksite 100. For example, one or more moisture sensors 541 may be buried below the surface at various locations over worksite 100, such as along haul roads 104 traveled by fluid delivery machine 106, to sense a moisture content of the worksite surface at their respective locations. Moisture sensor 541 may, in real-time or periodically, generate and communicate to flow controller 510 a signal indicative of a value of the moisture content of the worksite surface for use in the disclosed fluid delivery processes, as discussed below.

Clock 542 may determine the current time of day and date, and may periodically communicate a signal indicative of the time of day and date to flow controller 510 for use in the disclosed fluid delivery processes, discussed below. In one aspect, the time and date may be appended to or otherwise included with the signals associated with the other sensors discussed above.

It is to be appreciated that the various sensors of environmental sensing system 514 may be located onboard fluid delivery machine 106 or at various locations about the worksite 100. That is, these sensors may not necessarily be located together. For example, some sensors may be located on fluid delivery machine 106, while other sensors may be located at one or more stations over the length and width of worksite 100 (e.g., along haul roads 104 traveled by fluid delivery machine 106). In addition, different numbers of each type of sensor may be employed. For example, several dust sensors 536 and moisture sensors 541 may be provided at various locations on worksite 100, such as at intervals along haul roads 104, to provide localized indications of the dust level and moisture content of worksite 100. On the other hand, perhaps only one or two precipitation sensors 540, wind sensors 538, temperature sensors 528, pressure sensors 534, and humidity sensors 534 may be provided on worksite 100, such as at the periphery of the property or at a centralized location (e.g., at worksite control facility 108), to provide a more global indication of the conditions on worksite 100 with respect to these parameters. Any remote sensors may wirelessly communicate signals indicative of values of their respective sensed parameters to flow controller 510, such as via network 110, radio communication, infrared communication, or otherwise. Moreover, it is to be appreciated that additional, fewer, or different types of sensors configured to sense parameters other than those discussed above may be employed by flow control system 306.

Figure 6:
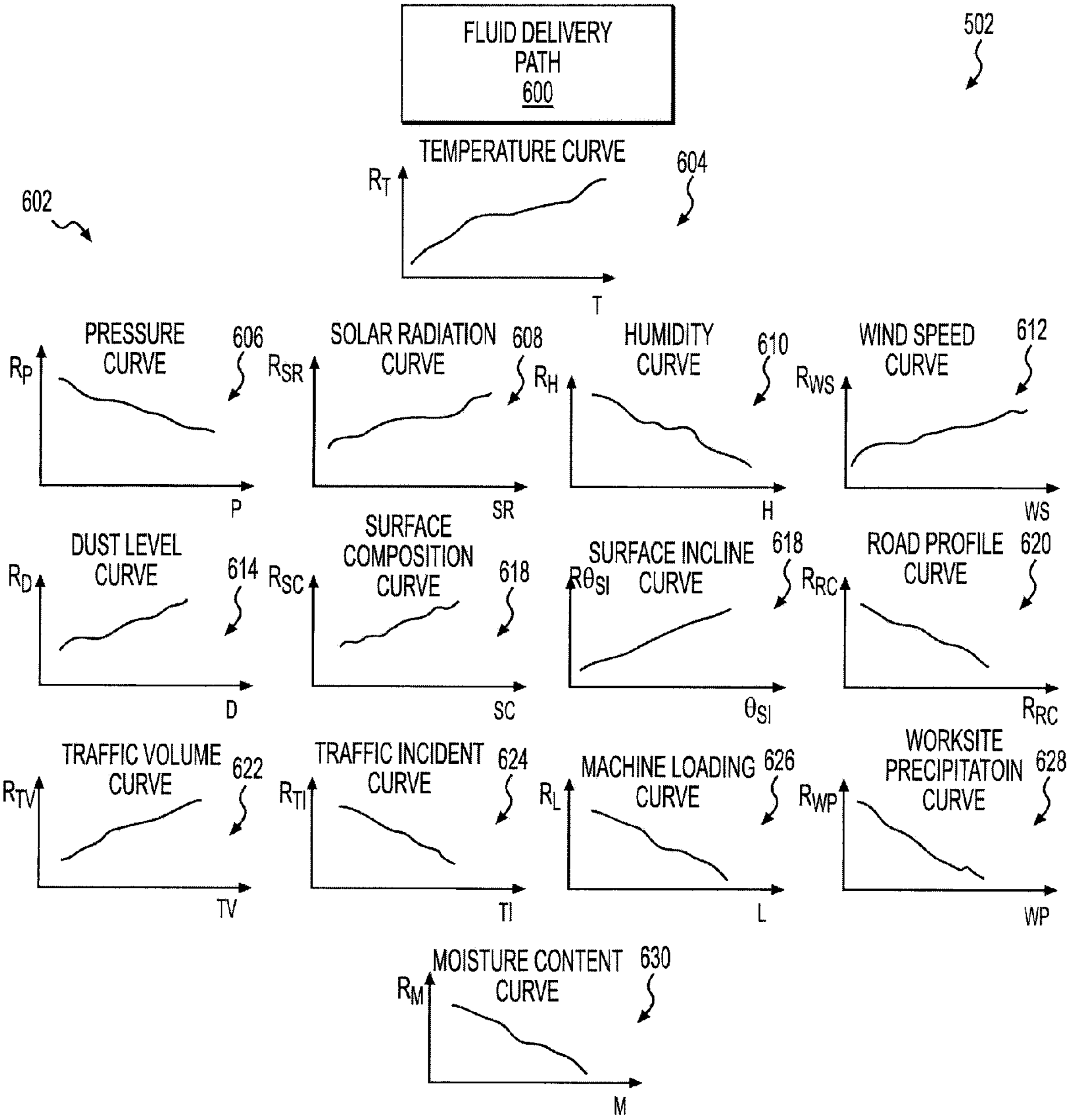
FIG. 6 is a representation of exemplary contents of a fluid delivery information database associated with the flow control system of FIG. 5, consistent with the disclosed embodiments.

Fluid delivery information database 502 may contain information enabling fluid delivery machine 106 to identify locations on worksite 100 at which to deliver fluid, and to determine an appropriate fluid delivery rate at the locations. For example, as shown in FIG. 6, fluid delivery information database 502 may include a fluid delivery path 600 and one or more fluid delivery rate component curves 602.

Fluid delivery path 600 may comprise information indicating a predetermined path over worksite 100 which fluid delivery machine 106 may while delivering fluid to the worksite surface. For example, fluid delivery path 600 may indicate a series of points between which fluid delivery machine 106 may travel to treat dust-sensitive areas of worksite 100. The points may be defined in latitude and longitude coordinates, worksite coordinates, or other types of coordinates. In one embodiment, fluid delivery path 600 may be set by a worksite administrator or engineer. For example, the worksite administrator or engineer may identify certain areas on worksite 100 as dust-sensitive areas (e.g., haul roads 104), and may set a corresponding fluid delivery path 600 allowing fluid delivery machine 106 to treat these areas in an efficient manner, taking into consideration worksite operations, available resources, or other factors. Fluid delivery path 600 may be displayed on operator interface 506 to enable an operator of fluid delivery machine 106 to control fluid delivery machine 106 to traverse fluid delivery path 600. Alternatively, in autonomous control scenarios, fluid delivery machine 106 may include an autonomous control system (not shown) that may automatically control fluid delivery machine 106 to travel fluid delivery path 600. Fluid delivery path 600 may also comprise information indicating an appropriate speed (e.g., 3 km/h) for fluid delivery machine 106 to travel the path.

Delivery rate component curves 602 may comprise any information enabling flow control system 306 to determine a suitable fluid delivery rate under a variety of circumstances, based on values of the environmental and machine operational parameters monitored by flow control system 306. In one embodiment, delivery rate component curves 602 may map values of one or more of the parameters monitored by flow control system 306 (e.g., ambient temperature, atmospheric pressure, humidity, etc.) to corresponding fluid delivery rate components. The combination or sum of these individual fluid delivery rate components may determine the overall fluid delivery rate $R_{Delivery}$ (i.e., the rate at which the fluid is sprayed onto the worksite surface). Accordingly, each flow rate component curve 602 may define only that portion of the overall fluid delivery rate $R_{Delivery}$ attributable to its respective parameter. Delivery rate component curves 602 may be stored in the memory of flow controller 510 as look-up tables, maps, formulae, or any other means for defining a relationship between the monitored parameters and corresponding fluid delivery rate components.

In one embodiment, delivery rate component curves 602 may be set by the worksite administrator or engineer based on experimental data or other knowledge about worksite 100. For example, based on past experience, the worksite administrator may know that fluid should be delivered to worksite 100 at a particular "base" rate (e.g., 1.5 liters per square meter per hour) under "normal" conditions to prevent undesired dust conditions from arising. These normal conditions may correspond to predetermined, baseline values for one or more of the parameters monitored by flow control system 306 (e.g., a certain ambient temperature, atmospheric pressure, humidity, etc.).

Having established the base flow rate for normal conditions, the worksite administrator or engineer may then determine how to weigh each monitored parameter with respect to the overall fluid delivery rate $R_{Delivery}$, thereby defining a baseline fluid delivery rate component for each monitored parameter (i.e., a baseline component rate corresponding to a predetermined value for the respective parameter). For example, humidity may be weighed more heavily than ambient temperature, ambient temperature may be weighed more heavily than atmospheric pressure, and dust level may be weighed more heavily than wind speed. Thus, the sum or combination of the various baseline fluid delivery rate components for the different monitored parameters may equal the overall baseline fluid delivery rate. The worksite administrator or engineer may then generate delivery rate component curves 602 by defining amounts in which the baseline fluid delivery rate components may vary with changes in the values of their corresponding monitored parameters. For example, the worksite administrator may determine that the fluid delivery rate component attributable to ambient temperature at worksite 100 should vary linearly between 0.1 liter per square meter per hour and 0.3 liters per square meter per hour over an ambient temperature range of 0° C. to 40° C. In other words, the worksite administrator or engineer may decide to weigh the ambient temperature component such that changes in temperature at worksite 100 may only affect changes in the overall fluid delivery rate within a certain range (i.e., holding the other variables constant). Based on this information, the worksite administrator or engineer may then set a fluid delivery rate component curve for temperature over the entire range.

As shown in FIG. 6, exemplary fluid delivery rate component curves 602 may include an ambient temperature curve 604, an atmospheric pressure curve 606, a solar radiation curve 608, a humidity curve 610, a wind speed curve 612, a dust level curve 614, a surface composition curve 616, a surface incline curve 618, a road profile curve 620, a traffic volume curve 622, a traffic incident curve 624, a machine loading curve 626, a worksite precipitation curve 628, and a surface moisture content curve 630.

Ambient temperature component curve 604 may define a relationship between the ambient temperature T (e.g., in degrees Celsius) at worksite 100 (on the x-axis) and a corresponding fluid delivery rate component $R_T$ (e.g., in liters per square meter per hour) (on they-axis) attributable to the ambient temperature T. That is, temperature component curve 604 may indicate only the portion of the overall fluid delivery rate $R_{Delivery}$ based on the ambient temperature Tat worksite 100, holding other variables constant. It is to be appreciated that, in general, the higher the ambient temperature Tat worksite 100, the greater rate at which moisture may evaporate and leave the worksite surface (and the greater the fluid delivery rate required to control dust conditions on worksite 100). Accordingly, as shown in FIG. 6, temperature component curve 604 may have a generally positive slope, such that the overall fluid delivery rate increases with ambient temperature T.

Atmospheric pressure component curve 606 may define a relationship between the atmospheric pressure P (e.g., in atms) at worksite 100 (on the x-axis) and a corresponding fluid delivery rate component $R_P$ (e.g., in liters per square meter per hour) (on they-axis) attributable to the atmospheric pressure P. That is, like temperature component curve 604, pressure component curve 606 may indicate only a portion of the overall fluid delivery rate $R_{Delivery}$ based on the atmospheric pressure P at worksite 100, holding other variables constant. It is to be appreciated that, in general, the lower the atmospheric pressure P at worksite 100, the greater rate at which moisture may evaporate and leave the worksite surface (and the greater the fluid delivery rate required to control dust conditions on worksite 100). Accordingly, as shown in FIG. 6, pressure component curve 606 may have a generally negative slope, such that the overall fluid delivery rate $R_{Delivery}$ decreases as atmospheric pressure P increases. Pressure component curve 606 may be determined based on experimental data or other information about worksite 100, as discussed above.

Solar radiation component curve 608 may define a relationship between the amount of solar radiation SR (e.g., in watts per square meter) at worksite 100 (on the x-axis), and a corresponding fluid delivery rate component $R_{SR}$ (e.g., in liters per square meter per hour) (on they-axis) attributable to the amount of solar radiation SR. That is, solar radiation component curve 608 may indicate only a portion of the overall fluid delivery rate $R_{Delivery}$ based on the amount of solar radiation SR at worksite 100, holding other variables constant. It is to be appreciated that, in general, the greater the solar radiation SR at worksite 100, the greater the rate at which moisture may evaporate and leave the worksite surface (and the greater the fluid delivery rate required to control dust conditions on worksite 100). Accordingly, as shown in FIG. 6, solar radiation component curve 608 may have a generally positive slope, such that the overall fluid delivery rate increases with an increase in the amount of solar radiation SR. Solar radiation component curve 608 may be determined based on experimental data or other information about worksite 100, as discussed above.

Humidity component curve 610 may define a relationship between the humidity H (e.g., in grams of water per cubic meter of air) at worksite 100 (on the x-axis), and a corresponding fluid delivery rate component $R_H$ (e.g., in liters per square meter per hour) (on they-axis) attributable to humidity H. That is, humidity component curve 610 may indicate only a portion of the overall fluid delivery rate based on the humidity H at worksite 100, holding other variables constant. It is to be appreciated that, in general, as the humidity H at worksite 100 increases, the rate at which moisture evaporates and leave the worksite surface may decrease. Accordingly, as shown in FIG. 6, humidity component curve 610 may have a generally negative slope, such that the overall fluid delivery rate $R_{Delivery}$ decreases with an increase in humidity H. Humidity component curve 610 may be determined based on experimental data or other information about worksite 100, as discussed above.

Wind speed component curve 612 may define a relationship between the wind speed WS (e.g., in kilometers per hour) at worksite 100 (on the x-axis), and a corresponding fluid delivery rate component $R_{WS}$ (e.g., in liters per square meter per hour) (on they-axis) attributable to the wind speed WS. That is, wind speed component curve 612 may indicate only portion of the overall fluid delivery rate based on the wind speed WS (e.g., an average wind speed in km/h) at worksite 100, holding other variables constant. It is to be appreciated that, in general, as the wind speed W at worksite 100 increases, the rate at which moisture may evaporate and leave the worksite surface may also increase (and the greater the fluid delivery rate required to control dust conditions on worksite 100). Accordingly, as shown in FIG. 6, wind speed component curve 612 may have a generally positive slope, such that the overall fluid delivery rate $R_{Delivery}$ increases with an increase in wind speed WS. Wind speed component curve 612 may be determined based on experimental data or other information about worksite 100, like the other component curves discussed above.

Dust level component curve 614 may define a relationship between a sensed dust level D (e.g., in parts per million) at worksite 100 (on the x-axis), and a corresponding fluid delivery rate component $R_D$ (e.g., in liters per square meter per hour) (on they-axis) attributable to the dust level D. That is, dust level component curve 614 may indicate only a portion of the overall fluid delivery rate $R_{Delivery}$ based on the sensed dust level D at worksite 100, holding other variables constant. For example, the worksite administrator or engineer may determine that, irrespective of other variables, additional fluid should be delivered to the worksite surface if the dust level is above a threshold, or as the dust level increases. Accordingly, as shown in FIG. 6, dust level component curve 614 may have a generally positive slope, such that the overall fluid delivery rate $R_{Delivery}$ increases as the sensed dust level D increases. Dust level component curve 614 may be determined based on experimental data or other information about worksite 100, as discussed above.

Surface composition component curve 616 may define a relationship between the composition SC (i.e., the type of material) of the worksite surface (on the x-axis) and a corresponding fluid delivery rate component $R_{SC}$ (e.g., in liters per square meter per hour) (on they-axis) attributable to the surface composition. That is, surface composition component curve 616 may set forth only a portion of the overall fluid delivery rate $R_{Delivery}$ based on the type of material making up the worksite surface. For example, the worksite administrator or engineer may determine that, irrespective of other variables, fluid should be delivered at a greater or lesser rate depending upon the type of material composing the worksite surface. It may be desirable to deliver fluid at a greater rate to "dustier" materials than to "less dusty" materials to help prevent undesired dust conditions from arising on worksite 100. Thus, in one embodiment, different types of worksite surface materials may be classified along a spectrum of how easily the materials weather and generate dust, and surface composition component curve 616 may be generated based on the spectrum. For example, coal, shale, and sandstone may be classified as "dusty" materials, whereas topsoil and oil sands may be classified as "less dusty." Accordingly, as shown in FIG. 6, surface composition component curve 616 may have a generally positive slope, such that the overall fluid delivery rate $R_{Delivery}$ is greater for "dustier" materials than for "less dusty" materials, holding the other variables constant.

Surface incline component curve 618 may define a relationship between the slope or inclination $\theta_{SI}$ (e.g., in degrees relative to the horizontal) of the worksite surface (on the x-axis) and a corresponding fluid delivery rate component $R_{\theta SI}$ (e.g., in liters per square meter per hour) (on they-axis) attributable to the slope or incline $\theta_{SI}$. That is, surface incline component curve 618 may indicate only a portion of the overall fluid delivery rate $R_{Delivery}$ based on the slope or incline $\theta_{SI}$ of the worksite surface. For example, the worksite administrator or engineer may determine that fluid should be delivered a lower rate to steep areas of worksite 100 than to flat or level areas of worksite 100. This may be desirable for safety measures, such as, providing additional traction to mobile machines 102 traversing inclines or declines. Accordingly, as shown in FIG. 6, surface incline component curve 618 may have a generally negative slope, such that the overall fluid delivery rate $R_{Delivery}$ decreases as the slope or inclination $\theta_{SI}$ of the worksite surface increases, holding the other variables constant.

Road profile component curve 620 may define a relationship between the radius of curvature RC (e.g., in meters) of a road on worksite 100 and a corresponding fluid delivery rate component $R_{RC}$ (e.g., in liters per square meter per hour) (on they-axis) attributable to the radius of curvature of the road. That is, road profile component curve 620 may set forth only a portion of the overall fluid delivery rate based on the degree of curvature of a road (e.g., haul road 104) on worksite 100. For example, the worksite administrator or engineer may determine that less fluid should be delivered to a curved road surface (e.g., a curve or intersection) than to a straight road surface, to help prevent mobile machines 102 or mine service vehicles on worksite 100 from losing traction or slipping while negotiating curves, intersections, etc. Accordingly, as shown in FIG. 6, road profile component curve 620 may have a generally negative slope, such that the overall fluid delivery rate decreases as the curvature RC of the road increases, holding the other variables constant.

Traffic volume component curve 622 may define a relationship between a volume of traffic TV (e.g., in vehicles per hour) on worksite 100 and a corresponding fluid delivery rate component $R_{TV}$ (e.g., in liters per square meter per hour) (on they-axis) attributable to the traffic volume. That is, traffic volume component curve 622 may indicate only a portion of the overall fluid delivery rate $R_{Delivery}$ based on the traffic volume TV on worksite 100, holding other variables constant. It is to be appreciated that wear from tires, tracks, treads, or other traction devices of mobile machines 102 may agitate and break up the worksite surface, generating dust. Moreover, airflow from passing traffic may cause the worksite surface to dry more quickly. In addition, heavy-traffic areas of worksite 100 may tend to include more worksite personnel, work areas, work activities or operations, machinery, etc. than low-traffic areas. Accordingly, the worksite administrator or engineer may determine that fluid should be delivered at a higher rate to high-traffic areas of worksite 100 than to low-traffic areas of worksite 100, in order to compensate for the increased agitation of the worksite surface in these areas, and in view of the additional worksite personnel, machinery, projects, etc. that may be exposed to dust in these areas. Accordingly, as shown in FIG. 6, traffic volume component curve 622 may have a generally positive slope, such that the overall fluid delivery rate increases with an increase in traffic volume TV, holding the other variables constant.

Traffic incident component curve 624 may define a relationship between reported traffic incidents TI (e.g., a number of incidents, or a ratio of the number of traffic incidents to traffic volume) on worksite 100 and a corresponding fluid delivery rate component $R_{TI}$ (e.g., in liters per square meter per hour) (on they-axis) attributable to the traffic incidents TI. That is, traffic incident component curve 624 may indicate only a portion of the overall fluid delivery rate $R_{Delivery}$, based on the reported traffic incidents TI, holding other variables constant. For example, a worksite administrator or engineer may determine that fluid should be delivered at a lower rate to areas susceptible to traffic incidents, or to areas where traffic incidents have occurred in the past, than to other areas of worksite 100, in order to improve traction in these areas. Traffic incidents may include, for example, vehicle slippage incidents, collisions, traffic jams, etc. Accordingly, as shown in FIG. 6, traffic incident component curve 624 may have a generally negative slope, such that the overall fluid delivery rate $R_{Delivery}$ decreases with an increase in traffic incidents TI. Traffic incident component curve 624 may be determined based on experimental data, traffic survey data, knowledge about the worksite surface, or other information about worksite 100.

Machine loading component curve 626 may define a relationship between the loading L (e.g., average utilized loading capacity as a percentage of maximum payload of) of mobile machines 102 on worksite 100 and a corresponding fluid delivery rate component $R_L$ (e.g., in liters per square meter per hour) (on they-axis) attributable to the loading L. That is, machine loading component curve 626 may indicate only a portion of the overall fluid delivery rate $R_{Delivery}$ based on the loading L of mobile machines 102 on worksite, holding other variables constant. For example, the worksite administrator or engineer may determine that fluid should be delivered at a lower rate to areas of worksite 100 where mobile machines 102 are carrying heavy loads than to other areas of worksite 100, in order to provide mobile machines 102 with increased traction to carry the loads safely. Accordingly, as shown in FIG. 6, machine loading component curve 626 may have a generally negative slope, such that the overall fluid delivery rate $R_{Delivery}$ decreases as machine loading increases, holding other variables constant. Machine loading component curve 626 may be determined based on experimental data, traffic survey data, knowledge about the worksite surface, or other information about worksite 100.

Worksite precipitation component curve 628 may define a relationship between an amount of precipitation WP at worksite 100 (e.g., in centimeters) and a corresponding fluid delivery rate component $R_{WP}$ (e.g., in liters per square meter per hour) (on they-axis) attributable to the amount of precipitation WP. That is, worksite precipitation component curve 628 may indicate only a portion of the overall fluid delivery rate $R_{Delivery}$ based on the amount of precipitation WP at worksite 100, holding other variables constant. For example, the worksite administrator or engineer may determine that a lower fluid delivery rate $R_{Delivery}$ is necessary when worksite 100 has recently received precipitation, or when worksite 100 is expected to receive precipitation in the near future. This may be desirable, for example, to conserve fluid delivery resources and to avoid overwatering worksite 100. Accordingly, as shown in FIG. 6, worksite precipitation component curve 628 may have a generally negative slope, such that the overall fluid delivery rate $R_{Delivery}$ decreases as the amount of precipitation WP at worksite 100 increases. In one embodiment, each position on the x-axis of worksite precipitation component curve 628 may correspond to an amount of precipitation WP at worksite 100 over a predetermined period of time (e.g., from several days before the current time to several days after the current time). Thus, worksite precipitation component curve 628 may define a fluid delivery rate component $R_{WP}$ based on an amount of recently received precipitation and an amount of expected future precipitation (e.g., weather report information from weather information database 505). Worksite precipitation component curve 628 may be determined based on experimental data, worksite survey data, or other information about worksite 100.

Moisture content component curve 630 may define a relationship between the moisture content M (e.g., volumetric water content) of the surface of worksite 100 (on the x-axis) and a corresponding fluid delivery rate component $R_M$ (e.g., in liters per square meter per hour) (on they-axis) attributable to the moisture content M. That is, moisture content component curve 630 may indicate only a portion of the overall fluid delivery rate based on the moisture content M of the worksite surface, holding other variables constant. It is to be appreciated that, in general, portions of the worksite surface having high moisture content may be less likely (or take a longer period of time) to dry out and generate dust than portions of the worksite surface having low moisture content. In addition, such portions of the worksite surface may have a reduced capacity to absorb additional fluid, which may result in standing water if additional fluid is delivered to these areas. Accordingly, high moisture content portions of the worksite surface may require a lower fluid delivery rate than low moisture content areas of the worksite surface, holding other variables constant. Thus, as shown in FIG. 6, moisture content component curve 630 may have a generally negative slope, such that the overall fluid delivery rate $R_{Delivery}$ decreases with an increase in worksite surface moisture content M. Moisture content component curve 630 may be determined based on experimental data or other information about worksite 100, as discussed above.

Figure 7:
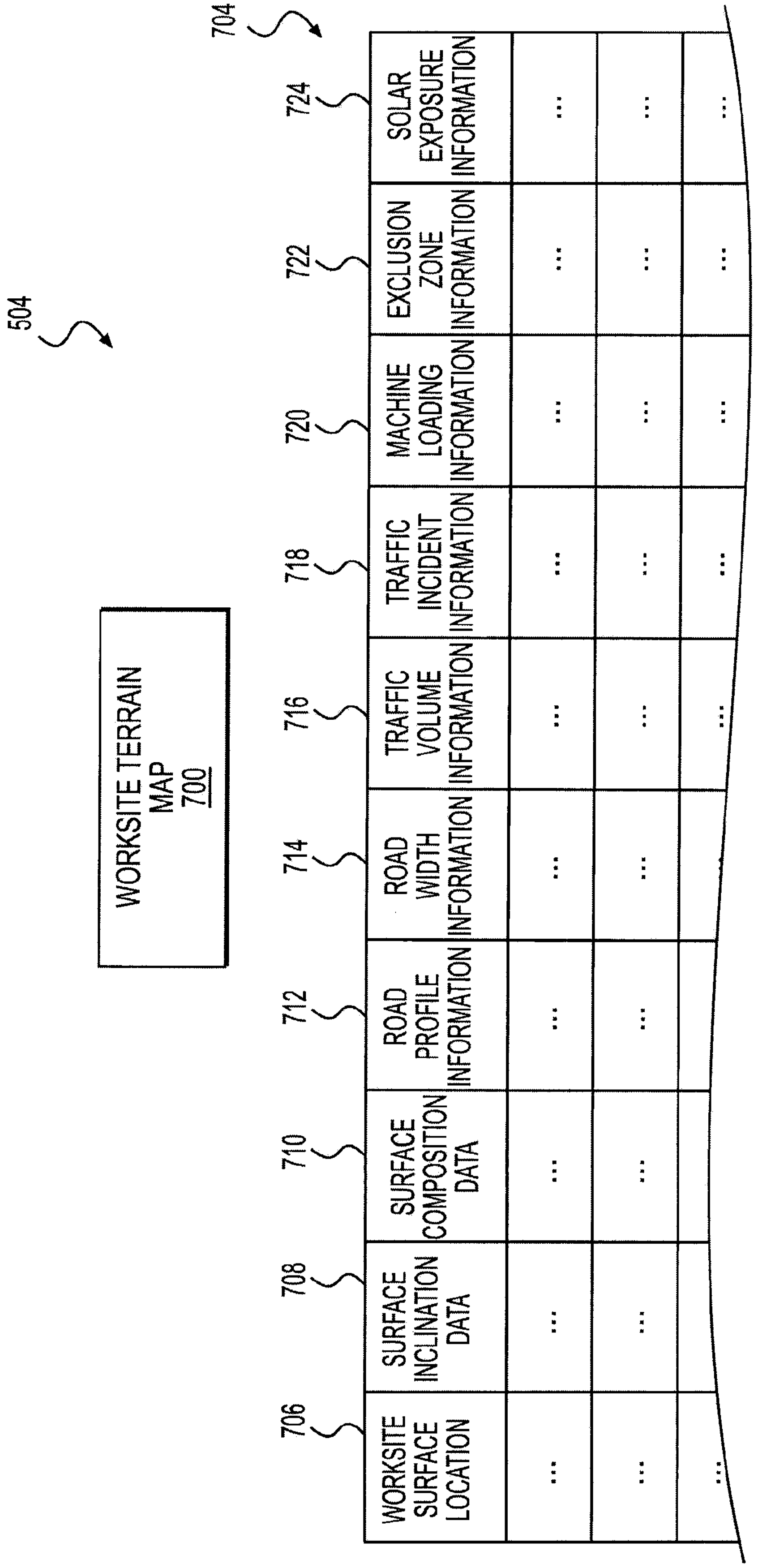
FIG. 7 is a representation of exemplary contents of a worksite information database associated with the flow control system of FIG. 5, consistent with the disclosed embodiments.

Returning to FIG. 5, worksite information database 504 may contain information about worksite 100 that flow control system 306 may use in conjunction with fluid delivery rate component curves 602 to determine, in real time, a rate $R_{Delivery}$ at which to deliver fluid to the worksite surface as fluid delivery machine 106 travels fluid delivery path 600. Worksite information database 504 may be stored in the memory associated with flow controller 510. FIG. 7 illustrates an exemplary representation of information contained in worksite information database 504. As shown, worksite information database 504 may include, for example, a worksite terrain map 702 and a worksite metadata table 704.

Worksite terrain map 702 may comprise an electronic map defining the surface of worksite 100 in mathematical coordinates. The coordinates may be based on a worksite coordinate system, a global positioning coordinate system (e.g., latitude and longitude coordinates), or any other type of coordinate system.

Worksite metadata table 704 may comprise a map, a lookup table, a matrix, or another data storage structure containing information defining characteristics of worksite 100. For example, worksite metadata table 704 may be indexed according to location 706 on the worksite surface, and may include surface inclination data 708, surface composition data 710, road profile information 712, road width information 714, traffic volume information 716, traffic incident information 718, machine loading information 720, exclusion zone information 722, and solar exposure information 724 corresponding to the worksite surface location 706. Worksite metadata table 704 may be created by the worksite administrator or engineer based on worksite survey information, experimental data, or other reports or information associated with worksite 100. Alternatively or additionally, worksite metadata table 704 may be updated periodically or in real time by flow controller 510 based on information communicated by other mobile machines 102 on worksite 100, information received from worksite control facility 108, or information input by an operator of fluid delivery machine 106 via operator interface 506.

Worksite surface location 706 may comprise a column of worksite metadata table 704, with each row thereof corresponding to a different location on the worksite surface. For example, worksite 100 may be divided up into an x-y grid having cells of a predetermined size (e.g., 25 square meters), and each row of worksite surface location column 706 may correspond to a different cell of worksite 100.

Surface inclination data 708 may include information about the slope or inclination $\theta_{SI}$ of the worksite surface. For example, surface inclination data 708 may comprise a column of worksite metadata table 704, and each row thereof may indicate a slope or inclination $\theta_{SI}$ (e.g., in percent grade or degrees relative to the horizontal) of the worksite surface in the cell of worksite 100 identified by that row of worksite surface location column 706. In one embodiment, surface inclination data 708 may indicate an average slope or inclination for the cell of worksite 100.

Surface composition data 710 may include information about the type of material SC composing the worksite surface. For example, surface composition data 710 may comprise a column of worksite metadata table 704, and each row thereof may indicate a classification of type of material SC composing the surface in the cell of worksite 100 corresponding to that row of worksite surface location column 706. For example, each cell may be classified along a spectrum of how easily the surface material in the cell of worksite 100 weathers and generates dust (e.g., on a scale of 1 to 10, from “less dusty” to “more dusty,” etc.).

Road profile information 712 may include information about the profiles of roads on worksite 100. For example, road profile information 712 may comprise a column of worksite metadata table 704, and each row thereof may indicate a radius of curvature RC (e.g., in meters) of any road located in the cell of worksite 100 corresponding to that row of worksite surface location column 706.

Road width information 714 may include information about the width of roads on worksite 100. For example, road width information 714 may comprise a column of worksite metadata table 704, and each row thereof may indicate the width of any road located in the cell of worksite 100 corresponding to that row of worksite surface location column 706. In one embodiment, road width information 714 may indicate the width of the road in units of length (e.g., meters). Alternatively or additionally, road width information 714 may classify the road as narrow, medium, or wide. As discussed below, road width information 714 may be used by flow controller 510 to determine an appropriate spray width or distribution for spray heads 202, and/or to select certain spray heads 202 to be turned on or off.

Traffic volume information 716 may include information about the volume TV of vehicular traffic on worksite 100. For example, traffic volume information 716 may comprise a column of worksite metadata table 704, and each row thereof may indicate a volume TV of vehicular traffic in the cell of worksite 100 corresponding to that row of worksite surface location column 706. For example, traffic volume information 716 may indicate the volume of traffic TV in the cells of worksite 100 in total number of vehicles (e.g., a historical running total) or in the number of vehicles passing through the cells per hour.

Traffic incident information 718 may include information about reported traffic incidents TI that have occurred on worksite 100. For example, traffic incident information 718 may comprise a column of worksite metadata table 704, and each row thereof may indicate a number of reported traffic incidents TI that have occurred in the cell of worksite 100 corresponding to that row of worksite surface location column 706 (e.g., a historical running total for the cell). Alternatively or additionally, traffic incident information 718 may be expressed as a ratio of the number of reported traffic incidents to the traffic volume in the cell of worksite 100, or in another manner indicating a degree to which the cell of worksite 100 is prone to traffic incidents. As indicated above, “traffic incident” may refer to a collision, a slippage incident, traffic congestion, or any other type of traffic event.

Machine loading information 720 may include information about the loading L of mobile machines 102 traveling on worksite 100. For example, machine loading information 720 may comprise a column of worksite metadata table 704, and each row thereof may indicate the loading of mobile machines 102 traveling in the cell of worksite 100 corresponding to that row of worksite surface location column 706. In other words, machine loading information 720 may indicate a degree to which mobile machines 102 traveling in the particular cell of worksite 100 are loaded (e.g., with payloads). For example, the loading of mobile machines 102 may be relatively high in areas of worksite 100 where haul trucks carry ore or other material between loading and drop-off locations. In one embodiment, machine loading information 720 may be expressed as an average utilized loading capacity (e.g., a percentage of maximum payload carried) of mobile machines 102 traveling within the cell of worksite 100. In another embodiment, machine loading information 720 may be expressed as the average payload (e.g., in tons) carried by mobile machines 102 within the cell of worksite 100. It is to be appreciated, however, that machine loading information 720 may be expressed in other ways.

Exclusion zone information 722 may identify areas of worksite 100 in which fluid delivery is prohibited or otherwise restricted. For example, the worksite administrator or engineer may define areas of worksite 100 containing buildings, mobile machines 102, vehicles, machinery, infrastructure, worksite personnel, work projects (e.g., excavation or construction projects), and the like as exclusion zones, as spraying fluid in these areas may interfere with ongoing work operations. In another example, the worksite administrator or engineer may define areas of worksite 100 having traffic intersections, difficult terrain (e.g., steep terrain or terrain where traffic incidents are common), poor visibility, or other challenges for vehicle operators as exclusion zones, as spraying fluid in these areas may render these areas slick or unsafe for vehicular traffic. In one embodiment, exclusion zone information 722 may comprise a column of worksite metadata table 704, and each row thereof may include information (e.g., “yes” or “no”) indicating whether the cell of worksite 100 corresponding to that row of worksite surface location column 706 includes an exclusion area—an area of worksite 100 where fluid delivery is prohibited or restricted.

In a further aspect, exclusion zone information 722 may also indicate a type of the exclusion zone, or a reason why fluid delivery to particular area of worksite 100 is prohibited or restricted. In one embodiment, exclusion zone information 722 may indicate whether the area of worksite 100 includes an object (e.g., a vehicle, a mobile machines 102, a building, a worker, stationary machinery, infrastructure, etc.), or whether the area of worksite 100 includes a worksite surface or terrain feature (e.g., challenging terrain, a traffic intersection, poor visibility, etc.).

Solar exposure information 724 may include information indicating whether the worksite surface is exposed to solar radiation, based on date and time of day. For example, solar exposure information 724 may comprise a column of worksite metadata table 704, and each row thereof may indicate whether the cell corresponding to that row of worksite surface location column 706 is exposed to solar radiation (e.g., sun or shade), based on the season (e.g., spring, summer, fall, winter) and the time of day (e.g., morning, afternoon, evening). It is to be appreciated that some worksites have areas that may or may not be exposed to solar radiation, depending upon the terrain, the time of day, and the season. For example, some areas of a deep, open mine pit may only be exposed to direct solar radiation between late morning and early afternoon.

Returning to FIG. 5, weather information database 505 may be stored in the memory of flow controller 510, and may contain weather information associated with worksite 100. The weather information may include, for example, historical weather information for worksite 100 and weather forecast information for worksite 100. In one embodiment, the weather information may indicate temperatures, solar radiation levels, cloud cover, humidity levels, barometric pressure, chance of precipitation, amount of precipitation, or other weather data for worksite 100.

Operator interface 506 may include a monitor, a touchscreen, a keypad, a control panel, a keyboard, a joystick, a lever, pedal, a wheel, or any other device known in the art for receiving input from or providing output to an operator. In connection with the disclosed fluid delivery processes, operator interface 506 may receive input from a machine operator, and may generate and communicate corresponding command signals to flow controller 510. Operator interface 506 may also display information to the machine operator based on signals received from flow controller 510.

Network interface 508 may include any hardware or software for sending and receiving data over network 110. For example, network interface 508 may include a modem, an Ethernet communication device, a fiber optic communication device, a cellular communication device, an infrared communication device, a satellite communication device, and/or any other network communication device capable of transmitting and receiving data over network 110. Accordingly, network interface 508 may be configured to communicate using satellite, cellular, infrared, radio, or other types of wireless communication signals.

Flow controller 510 may include means for monitoring, recording, storing, indexing, processing, or communicating information in connection with the disclosed fluid delivery processes. Flow controller 510 may include a memory, a secondary data storage device (e.g., a magnetic or optical disc drive), a processor (e.g., a CPU), or any other components for running programs for performing the disclosed functions of flow control system 306. Various other circuits may be associated with flow controller 510, such as power supply circuitry, signal conditioning circuitry, data acquisition circuitry, signal output circuitry, signal amplification circuitry, and other types of circuitry known in the art.

Flow controller 510 may receive the signals from the various sensors of machine operation sensing system 512 and environmental sensing system 514, and may store the values associated with the sensed parameters in memory for use in subsequent processing, discussed below. For sensors not located on mobile fluid delivery machine 106 (e.g., dust sensor(s) 536 or moisture sensor(s) 541), flow controller 510 may index the various parameter values according to respective known locations of the sensors. For example, flow controller 510 may associate coordinates (e.g., latitude and longitude) identifying the locations of the sensors on the worksite surface with the actual values of the parameters measured by the sensors (e.g., temperature, pressure, dust level, moisture content, etc.).

In one embodiment, flow controller 510 may be configured to determine (1) a suitable rate $R_{Delivery}$ at which to deliver fluid to the worksite surface, and (2) a suitable width or distribution of the fluid delivery (i.e., the width or distribution of the spray from spray heads 202), to control dust conditions on worksite 100. As described in detail below, flow controller 510 may determine the fluid delivery rate $R_{Delivery}$ and distribution based on the signals received from one or more of the sensors of machine operation sensing system 512 and environmental sensing system 514; information contained in fluid delivery information database 502, worksite information database 504, and/or weather information database 505; information received from operator interface 506; and/or information received from mobile machines 102 or worksite control facility 108.

Figure 8:
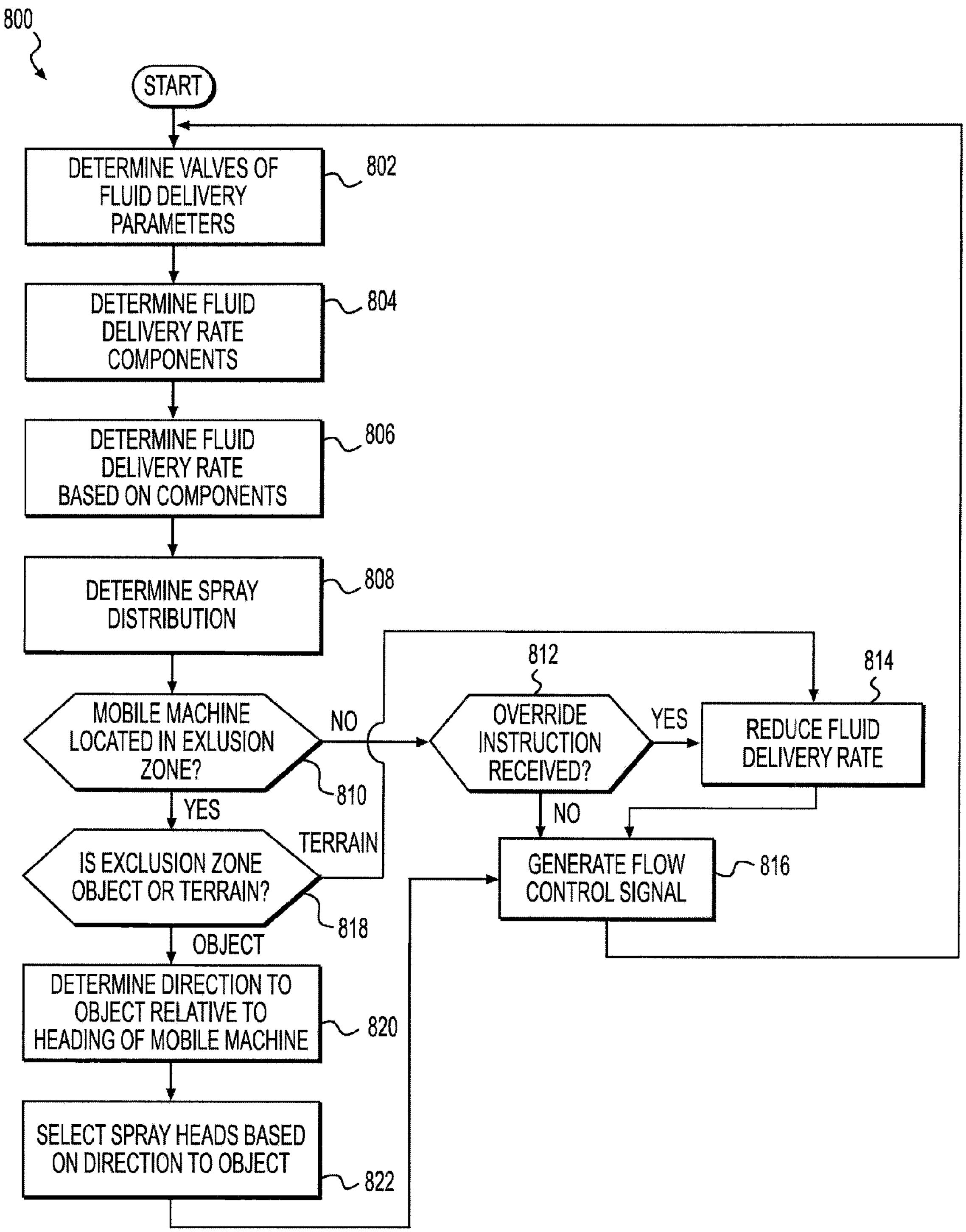
FIG. 8 is a flow chart illustrating an exemplary fluid delivery process performed by the flow control system shown in FIG. 5, consistent with the disclosed embodiments.

FIG. 8 illustrates an exemplary fluid delivery determination process 800 that flow controller 510 may perform as fluid delivery machine 106 travels fluid delivery path 600 (e.g., haul roads 104), consistent with the disclosed embodiments. In step 802, flow controller 510 may determine the values of one or more of the fluid delivery parameters discussed above. For example, flow controller 510 may first determine values for one or more of the "weather" or "environmental" parameters discussed above. Specifically, flow controller 510 may determine values for ambient temperature T (e.g., in ° C.), atmospheric pressure P (e.g., in atms), solar radiation SR (e.g., in watts per square meter), humidity H (e.g., in mass of water per unit volume of air), and wind speed WS (e.g., in km/h) at worksite 100 based on the respective signals received from temperature sensor 528, pressure sensor 532, radiation sensor 530, humidity sensor 534, and wind sensor 538. Alternatively or additionally, flow controller 510 may retrieve values for these parameters from weather information database 505. In addition, flow controller 510 may determine a value for the amount of recent and expected precipitation WP (e.g., in centimeters) at worksite 100 (e.g., over the predetermined period of time) using weather information database 505. Flow controller 510 may alternatively or additionally determine a value for the amount of recent and expected precipitation WP at worksite 100 based on precipitation data gathered by precipitation sensor 540.

Also in connection with step 802, flow controller 510 may determine values of one or more of the "worksite surface" parameters discussed above. Specifically, flow controller 510 may determine values for the dust level D (e.g., in parts per million), moisture content M of the worksite surface (e.g., the volumetric water content), surface composition SC (e.g., "more dusty" to "less dusty"), slope or inclination $\theta_{SI}$ (e.g., in percent grade or degrees from the horizontal), and road profile RP (e.g., radius of curvature in meters) at the location of fluid delivery machine 106 on worksite 100. For example, in a case where dust sensor 536 is located on mobile fluid delivery machine 106, flow controller 510 may determine the value for the dust level D at the location of fluid delivery machine 106 on worksite 100 based on the signal received from dust sensor 536 (e.g., stored in memory). In a case where one or more dust sensors 536 are positioned at different locations about the worksite surface, flow controller 510 may determine the value for the dust level D based on the signal of a dust sensor 536 located nearest to mobile fluid delivery machine 106. Alternatively or additionally, flow controller 510 may determine the value for the dust level D by averaging the values indicated by the signals of multiple dust sensors 536 in the proximity of mobile fluid delivery machine 106 on the worksite surface.

Similarly, flow controller 510 may determine the value for the moisture content M of the worksite surface at the location of fluid delivery machine 106 based on the signal received from moisture sensor 541 (e.g., stored in memory). In a case where one or more moisture sensors 541 are positioned at different locations about the worksite surface, flow controller 510 may determine the value for the moisture content M of the worksites surface based on the signal of a moisture sensor 541 located nearest to mobile fluid delivery machine 106. Alternatively or additionally, flow controller 510 may determine the value for the moisture content M of the worksite surface by averaging the values indicated by the signals of multiple moisture sensors 541 in the proximity of mobile fluid delivery machine 106 or of moisture sensors 541 at other locations on worksite 100.

Flow controller 510 may determine a value SC (e.g., "more dusty" or "less dusty") for the worksite surface composition at the location of fluid delivery machine 106 on worksite 100 using worksite metadata table 704. Specifically, flow controller 510 may determine the location of fluid delivery machine 106 based on the signal received from location device 522. Flow controller 510 may then look up that location in worksite surface location column 706, and may retrieve the corresponding surface composition value SC from surface composition data column 710.

Similarly, flow controller 510 may determine a value $\theta_{SI}$ for the slope or inclination of the worksite surface at the location of fluid delivery machine 106 by looking up the location of fluid delivery machine 106 in worksite surface location column 706 of worksite metadata table 704, and retrieving the corresponding slope or inclination value $\theta_{SI}$ from worksite surface inclination data column 708. Flow controller 510 may alternatively or additionally determine the slope or inclination value $\theta_{SI}$ based on the signal received from orientation sensor 524, or by computing a gradient or slope at the location of fluid delivery machine 106 using worksite terrain map 702.

Flow controller 510 may also determine a radius of curvature RC of a road (e.g., haul road 104) at the location of fluid delivery machine 106 using worksite metadata table 704. Specifically, flow controller 510 may look up the location of fluid delivery machine 106 in worksite surface location column 706, and may retrieve the corresponding radius of curvature RC from road profile information column 712. Alternatively or additionally, flow controller 510 may determine a radius of curvature RC of the road based on the signal received from steering angle sensor 518.

Further in connection with step 802, flow controller 510 may determine values of one or more of the "worksite operations" parameters discussed above. Specifically, flow controller 510 may determine values for traffic volume TV (e.g., in vehicles per hour), traffic incidents TI (e.g., number of traffic incidents or ratio of traffic incidents to traffic volume), and machine loading L (e.g., a percentage of average utilized loading capacity) at the location of fluid delivery machine 106 on worksite 100.

For example, flow controller 510 may determine a value TV for traffic volume at the location of fluid delivery machine 106 on worksite 100 using worksite metadata table 704. Specifically, flow controller 510 may determine the location of fluid delivery machine 106 based on the signal received from location device 522. Flow controller 510 may then look up that location in worksite surface location column 706, and may retrieve the corresponding traffic volume value TV from traffic volume information column 716. Flow controller 510 may similarly retrieve values for traffic incidents TI and machine loading L at the location of fluid delivery machine 106 from traffic incident information column 718 and machine loading information column 720, respectively.

In step 804, flow controller 510 may determine fluid delivery rate components based on the values of the fluid delivery parameters determined in step 802. For example, flow controller 510 may look up the values of ambient temperature T, atmospheric pressure P, solar radiation SR, humidity H, wind speed WS, recent and expected worksite precipitation WP, dust level D, surface composition SC, slope or inclination $\theta_{SI}$, road profile RP, traffic volume TV, traffic incidents TI, machine loading L, and surface moisture content M determined in step 802 in temperature component curve 604, pressure component curve 606, solar radiation component curve 608, humidity component curve 610, wind speed curve 612, worksite precipitation curve 628, dust level curve 614, surface composition component curve 616, surface incline curve 618, road profile curve 620, traffic volume curve 622, traffic incident curve 624, machine loading curve 626, and moisture content component curve 630, respectively. Flow controller 510 may then determine from these component curves 602 respective values for the fluid delivery rate components:

$R_T$, $R_P$, $R_{SR}$, $R_H$, $R_{WS}$, $R_{WP}$, $R_D$, $R_{SC}$, $R_{\theta SI}$, $R_{RP}$, $R_{TV}$, $R_{TI}$, $R_{VL}$, and $R_M$.

In one embodiment, flow controller 510 may modify the solar radiation fluid delivery rate component $R_{SR}$ to account for the slope or inclination $\theta_{SI}$ of the worksite surface at the location of fluid delivery machine 106. It is to be appreciated that, in some cases, the intensity of solar radiation SR at worksite 100 may be determined with respect to the horizontal (i.e., flat ground). For example, radiation sensor 530 may be positioned on a horizontal surface, or weather information database 505 may contain a solar radiation measurement taken with respect to horizontal ground. Thus, the measured solar radiation value SR may not reflect the true intensity of the solar radiation incident on sloped or inclined portions of the worksite surface. Accordingly, in one embodiment, flow controller 510 may adjust the solar radiation fluid delivery rate component $R_{SR}$ based on the slope or inclination $\theta_{SI}$ at the location of fluid delivery machine 106 on the worksite surface. For example, flow controller 510 may compute an adjusted solar radiation fluid delivery rate component $R_{SR}'$ according to $R_{SR}'=R_{SR}\sin(\theta_{SI})$, where $R_{SR}$ is the solar radiation fluid delivery rate component as determined from solar radiation component curve 608, and $\theta_{SI}$ is the slope or inclination of the worksite surface at the location of fluid delivery machine 106.

Alternatively or additionally, flow controller 510 may select a predetermined value for the solar radiation fluid delivery rate component $R_{SR}$ based on worksite metadata table 704. For example, flow controller 510 may determine the time of day and date based on the signal received from clock 542. Flow controller 510 may then look up the location of fluid delivery machine 106 indicated by the signal from location device 522 in worksite surface location column 706 of worksite metadata table 704. Flow controller 510 may then retrieve the solar exposure information (e.g., sun or shade) from solar exposure information column 724, corresponding to the time of day and date. Flow controller 510 may then convert the solar exposure information (e.g., sun or shade) to a predetermined solar radiation value SR (e.g., in watts per square meter), and may look up that value on solar radiation component curve 608 to retrieve a corresponding solar radiation fluid delivery rate component $R_{SR}$.

In step 806, flow controller 510 may determine an overall fluid delivery rate $R_{Delivery}$ based on the fluid delivery rate components determined in step 804. In one embodiment, flow controller 510 may determine the overall fluid delivery rate $R_{Delivery}$ by adding the fluid delivery rate components as follows:

$$R_{Delivery}=R_T+R_P+R_{SR}+R_H+R_{WS}+R_{WP}+R_D+R_{SC}+R_{\theta SI}+R_{RP}+R_{TV}+R_{TI}+R_{VL}+R_M.$$

It is to be appreciated, however, that flow controller 510 may determine the overall fluid delivery rate $R_{Delivery}$ in other ways. For example, flow controller 510 may use fewer than all the fluid delivery rate components discussed above, such as in a case where not all of the parameters discussed above are monitored by flow control system 306, to determine the overall fluid delivery rate $R_{Delivery}$ (e.g., only temperature, pressure, humidity, and surface inclination). In such a case, flow controller 510 may appropriately weigh or adjust these individual fluid delivery rate components, and/or the fluid delivery rate $R_{Delivery}$, to deliver fluid to the worksite surface at an appropriate rate. In another example, flow controller 510 may calculate an evaporation index based on the "weather" parameters monitored by flow control system 306, and may determine the overall fluid delivery rate $R_{Delivery}$ based on the evaporation index. Optionally, flow controller 510 may then modify the overall fluid delivery rate $R_{Delivery}$ based on one or more of the monitored "worksite operations" parameters (e.g., machine loading, traffic volume, etc.) and/or "worksite surface" parameters (e.g., slope or inclination, surface composition, etc.) discussed above. In another example, flow controller 510 may have a "baseline" fluid delivery rate stored in memory, and may modify or adjust the baseline fluid delivery rate depending upon the amounts in which the values of the various monitored parameters deviate from respective "baseline" values. It is also noted that the individual fluid delivery rate components may have negative values, thereby reducing the overall fluid delivery rate $R_{Delivery}$ when combined with other, positive fluid delivery rate components. For example, if a significant amount of precipitation is expected at worksite 100 over the predetermined window, the worksite precipitation fluid delivery rate component $R_{WP}$ may have a negative value. In another example, if the humidity at worksite 100 is greater than a certain threshold, the humidity fluid delivery rate component $R_H$ may have a negative value. Accordingly, the exemplary methods of calculating the overall fluid delivery rate $R_{Delivery}$ are intended only to illustrate the principles of the disclosure, rather than to limit the scope of the disclosure in any way. Additional methods of computing the fluid delivery rate $R_{Delivery}$, consistent with the disclosed principles, may become apparent to one of ordinary skill in the art upon studying the disclosure.

It is to be appreciated that, as fluid delivery machine 106 changes speed while traveling fluid delivery path 600, the actual rate (e.g., liters per minute) at which fluid is sprayed from spray heads 202 may need to be adjusted in order to maintain the desired overall fluid delivery rate $R_{Delivery}$ (e.g., liters per square meter per hour) irrespective of the travel speed. Thus, as fluid delivery machine 106 increases or decreases speed while traveling fluid delivery path 600, fluid delivery system 304 may appropriately increase or decrease the actual fluid output rate, based on the travel speed, in order to maintain the desired overall fluid delivery rate $R_{Delivery}$.

Further, flow controller 510 may modify or adjust the fluid delivery rate $R_{Delivery}$ based on a precipitation rate detected by precipitation sensor 540. Reducing the fluid delivery rate $R_{Delivery}$ based on the rate of precipitation on worksite 100, if any, may help conserve resources and avoid overwatering worksite 100. For example, if it is lightly raining on worksite 100, the fluid delivery rate $R_{Delivery}$ may be reduced accordingly. Thus, as fluid delivery machine 106 travels fluid delivery path 600, flow controller 510 may calculate a precipitation rate (e.g., a current precipitation rate or a rate of precipitation over a predetermined period of time) based on the signal received from precipitation sensor 540, and may subtract the calculated precipitation rate from the fluid delivery rate $R_{Delivery}$ to obtain a modified fluid delivery rate.

Further, flow controller 510 may modify or adjust the fluid delivery rate $R_{Delivery}$ based on a precipitation rate detected by precipitation sensor 540. Reducing the fluid delivery rate $R_{Delivery}$ based on the current rate of precipitation on worksite 100, if any, may help conserve resources and avoid overwatering worksite 100. For example, if it is lightly raining on worksite 100, the fluid delivery rate $R_{Delivery}$ may be reduced accordingly. Thus, as fluid delivery machine 106 travels fluid delivery path 600, flow controller 510 may calculate a current precipitation rate based on the signal received from precipitation sensor 540, and may subtract the calculated precipitation rate from the fluid delivery rate $R_{Delivery}$ to obtain a modified fluid delivery rate.

Continuing with FIG. 8, in step 808, flow controller 510 may determine a spray distribution or width for spray heads 202. For example, flow controller 510 may look up the location of fluid delivery machine 106 in worksite surface location column 706, and may retrieve the corresponding road width value (e.g., narrow, medium, wide, x meters, etc.) from road width information column 714. Based on the retrieved road width value, flow controller 510 may select a spray distribution or width (e.g., narrow, medium, wide, etc.) for spray heads 202.

In step 810, flow controller 510 may determine whether fluid delivery machine 106 is within an exclusion zone on worksite 100. For example, flow controller 510 may look up the location of fluid delivery machine 106 in worksite surface location column 706, and may retrieve the corresponding exclusion zone indicator (e.g., "yes" or "no") from exclusion zone information column 722. Alternatively or additionally, flow controller 510 may use machine vision device 516 and worksite terrain map 702 to determine whether fluid delivery machine 106 is located within an exclusion zone. For example, as fluid delivery machine 106 travels fluid delivery path 600, flow controller 510 may receive the signals from machine vision device 516 indicative of the sensed ranges and directions to points on the surface of worksite 100 in the proximity of fluid delivery machine 106. Based on the sensed ranges and directions and on the known location of fluid delivery machine 106, flow controller 510 may determine coordinates of the sensed points with respect to a worksite coordinate system. Flow controller 510 may then compare the coordinates of the sensed points to the coordinates of corresponding points stored in worksite terrain map 702 to determine whether they agree. If, for example, the heights (e.g., the z-coordinates) of the sensed points and the stored points do not agree within a tolerance, flow controller 510 may determine that an "unexpected" object (e.g., a vehicle, a worker, a building, etc.) is on the worksite surface in the proximity of fluid delivery machine 106, and may treat the location of fluid delivery machine 106 as an exclusion zone. In other words, if flow controller 510 determines that the points sensed by machine vision device 516 do not agree with corresponding points stored in worksite terrain map 702 with respect to height, flow controller 510 may determine that the location of fluid delivery machine 106 on worksite 100 is an exclusion zone.

If flow controller 510 determines in step 810 that fluid delivery machine 106 is not within an exclusion zone, flow controller 510 may proceed to step 812. In step 812, flow controller 510 may determine whether an override instruction has been received. The override instruction may come in the form of a signal received from operator interface 506 or from worksite control facility 108 to terminate fluid delivery. For example, the operator of fluid delivery machine 106 may decide that it is time for a lunch break, and may provide input to operator interface 506 to terminate fluid delivery (e.g., press a "stop" button). Alternatively, in an autonomous control context, worksite control facility 108 may send a signal to terminate fluid delivery and to instruct fluid delivery machine 106 to return to a dispatch location for service. In another embodiment, the operator may provide input to reduce or terminate fluid delivery to selected spray heads 202 (e.g., on the left or right side of fluid delivery machine 106), such as to handle passing traffic.

If flow controller 510 determines in step 812 that an override instruction has been received, flow controller 510 may reduce the fluid delivery rate $R_{Delivery}$ in step 814. For example, flow controller 510 may set the fluid delivery rate $R_{Delivery}$ to zero to command termination of fluid delivery. Flow controller 510 may then generate or modify the flow control signal in step 816 (e.g., as described above). In the flow control signal, however, the fluid delivery rate parameter $R_{Delivery}$ may be set to zero to command fluid delivery system 304 to terminate fluid delivery. Alternatively, if the operator has selected to terminate fluid delivery for only certain spray heads 202, flow controller 510 may generate or modify the flow control signal such that the fluid delivery burden is distributed among the active (i.e., "on") spray heads 202. For example, if the operator has selected to terminate fluid delivery on the left side of mobile fluid delivery machine 106 to accommodate passing traffic, the flow control signal may distribute the fluid delivery burden to spray heads 202 on the right side of mobile fluid delivery machine 106 (e.g., 50% to spray head 202*a* and 50% to spray head 202*b*).

If flow controller 510 determines in step 812 that an override instruction has not been received, flow controller 510 may then generate or modify a flow control signal as in step 816. In this case, however, flow controller 510 may set the fluid delivery rate parameter $R_{Delivery}$ of the flow control signal to the value determined in step 806. In addition, flow controller 510 may set the flow control signal parameters Delivery $Amount_{Head1}$, Delivery $Amount_{Head2}$ and Delivery $Amount_{Head3}$ each to 33%, such that the fluid delivery burden is distributed evenly among spray heads 202. Flow controller 510 may also set the flow control signal parameters of $Distribution_{Head1}$, $Distribution_{Head2}$, and $Distribution_{Head3}$ based on the spray distribution or width determined in step 808 (e.g., narrow, medium, or wide). In other words, flow controller 510 may command fluid delivery system 304 to deliver fluid to worksite 100 at the rate $R_{Delivery}$ determined in step 806, the distribution or width determined in step 808, and with the fluid delivery burden distributed evenly among spray heads 202.

If flow controller 510 determines in step 810 that fluid delivery machine 106 is located within an exclusion zone, flow controller 510 may proceed to step 818. In step 818, flow controller 510 may determine whether the exclusion zone is due to an on object on worksite 100 or to terrain or a surface feature of worksite 100. For example, flow controller 510 may identify the location of fluid delivery machine 106 in worksite surface location column 706, and may retrieve the corresponding exclusion zone type (e.g., "object" or "terrain") from exclusion zone information column 722. Alternatively or additionally, flow controller 510 may determine that the exclusion zone relates to an object on worksite 100 based on signals received from machine vision device 516, as described above.

If flow controller 510 determines in step 818 that the exclusion zone relates to terrain or a surface feature on worksite 100, flow controller 510 may proceed to step 814, discussed above. For example, if flow controller 510 determines that fluid delivery machine 106 is at an area of worksite 100 having a traffic intersection, difficult terrain, poor visibility, or other challenges for vehicle operators, flow controller 510 may command fluid delivery system 304 to terminate fluid delivery or to reduce the fluid delivery rate $R_{Delivery}$. In this case, however, instead of setting the fluid delivery rate $R_{Delivery}$ to zero, flow controller 510 may alternatively reduce the fluid delivery rate $R_{Delivery}$ by a predetermined proportion (e.g., 25%, 50%, 75%, etc.), by a predetermined amount, or in any other manner appropriate to treat the exclusion zone.

If flow controller 510 determines in step 818 that the exclusion zone relates to an object on worksite 100, flow controller 510 may proceed to step 820. In step 820, flow controller 510 may determine the direction to the object with respect to the heading of fluid delivery machine 106. For example, flow controller 510 may analyze the signals from location device 522 and from orientation sensor 524 to determine the location and the heading of fluid delivery machine 106, respectively. Flow controller 510 may then determine range and direction to the object from fluid delivery machine 106 based on signals received from machine vision device 516. Alternatively or additionally, flow controller 510 may retrieve the location of the object from exclusion zone information column 722. Based on the heading of fluid delivery machine 106 and the direction to the object from fluid delivery machine 106, flow controller 506 may determine an angle to the object with respect to the heading of fluid deliver machine 106 (e.g., from 0 to 360 degrees).

In step 822, flow controller 510 may select one or more of spray heads 202 for fluid delivery based on the direction to the object from fluid delivery machine 106. For example, in order to avoid spraying the object, flow controller 510 may select only spray heads 202 that do not spray in the direction of the object. For example, based on the direction to the object with respect to heading of fluid delivery machine 106 (determined in step 820), flow controller 510 may determine whether the object is located to the front, right, rear, or left of fluid delivery machine 106. In one embodiment, if the object is located to the right side of fluid delivery machine 106 with respect to the direction of travel, flow controller 510 may select only spray head 202*a* and/or spray head 202*c*. If the object is located to the left side of fluid delivery machine 106 with respect to the direction of travel, flow controller 510 may select only spray head 202*a* and/or 202*b*. If the object is located behind fluid delivery machine 106 with respect to the direction of travel, flow controller 510 may select only spray head 202*a*.

Upon completion of step 822, flow controller 510 may proceed to step 816 to generate or modify the flow control signal, as described above. In this case, however, flow controller 510 may set the fluid delivery rate parameter $R_{Delivery}$ of the flow control signal to the value determined in step 806. In addition, flow controller 510 may set the flow control signal parameters Delivery $Amount_{Head1}$, Delivery $Amount_{Head2}$ and Delivery $Amount_{Head3}$ based on the result of step 822. For example, if only spray head 202*a* is selected in step 822, flow controller 510 may set the flow control signal parameters Delivery $Amount_{Head1}$, Delivery $Amount_{Head2}$ and Delivery $Amount_{Head3}$ to 100%, 0%, and 0%, respectively. Similarly, if only spray heads 202*a* and 202*b* are selected in step 822, flow controller 510 may set the flow control signal parameters Delivery $Amount_{Head1}$, Delivery $Amount_{Head2}$, and Delivery $Amount_{Head3}$ to 50% and 50%, respectively. Also, flow controller 510 may set the flow control signal parameters $Distribution_{Head1}$, $Distribution_{Head2}$, and $Distribution_{Head3}$ for the selected spray heads 202 based on the spray distribution or width determined in step 808 (e.g., narrow, medium, or wide). In other words, flow controller 510 may generate a flow control signal commanding fluid delivery system 304 to deliver fluid at the fluid delivery rate $R_{Delivery}$ determined in step 806, with the spray distribution or width determined in step 808, using only the spray heads 202 selected in step 822.

Flow controller 510 may also update worksite information database 504 and weather information database 505 periodically or in real-time based on received information. For example, mobile machines 102 or worksite control facility 108 may periodically communicate to fluid delivery machine 106 information regarding the current locations, loading, and inclinations of mobile machines 102, which flow controller 510 may use to update surface inclination data 708, traffic volume information 716, machine loading information 720, and exclusion zone information 722. In addition, worksite personnel may carry communication devices that transmit their locations to fluid delivery machine 106 or to worksite control facility 108, which may also be used to update exclusion zone information 722. In addition, mobile machines 102 or worksite control facility 108 may communicate information regarding the involvement of mobile machines 102 in traffic incidents (e.g., accidents, loss of traction, traffic congestion, etc.), which may be used to update traffic incident information 718. Weather reports received from worksite control facility may be used to update weather information database 505. Alternatively or additionally, weather information may be gathered by sensing system 500 to update weather information database 505. Still further, an operator of fluid delivery machine 106 may input information to operator interface 505 to update worksite information database 504 or weather information database 505.

Worksite control facility 108 may include a monitoring facility, a central data facility, a dispatch control facility, and/or another facility capable of communicating with mobile machines 102. Although some elements of flow control system 306 have been described above as located on fluid delivery machine 106, it is to be appreciated that one or more of these elements may alternatively or additionally be implemented at worksite control facility 108. For example, some elements of flow control system 306, including flow controller 510, may be located at worksite control facility 108. The sensors of sensing system 500 (e.g., onboard fluid delivery machine 106 or at other locations on worksite 100) may communicate the signals indicative of the values of their respective sensed parameters to worksite control facility 108 (e.g., via network 110). Flow controller 510, housed at worksite control facility 108, may then perform the disclosed fluid delivery determination described above, and may transmit the flow control signal to fluid delivery machine 106 over network 110. Fluid delivery system 304, onboard fluid delivery machine 106, may then deliver fluid to the worksite surface in accordance with the flow control signal as described above.

Network 110 may comprise any analog or packet-switched network capable of carrying information among mobile machines 102 and worksite control facility 108. For example, network 110 may include, alone or in suitable combination, the Internet, a dedicated or private intranet, a telephony-based network (e.g., PSTN), a local area network (LAN), a wide area network (WAN), a digital subscriber line (DSL), and/or any other suitable network or network elements. Network 110 may communicate based on Transmission Control Protocol/Internet Protocol (TCP/IP), Hyper Text Transfer Protocol (HTTP), SOAP, Remote Procedure Call (RPC), and/or other suitable communication protocols known in the art.

INDUSTRIAL APPLICABILITY

The disclosed embodiments may be applicable to any environment in which it is desirable to deliver fluid to area under varying environmental or operational conditions. For example, as described above, the disclosed embodiments may apply to a mobile fluid delivery vehicle for delivering fluid to a worksite, such as a mining, excavation, or material stockpile (e.g., a coal pile) site, to control worksite dust conditions. Aside from dust control applications, the disclosed fluid delivery processes may be used to maintain roads or other worksite surfaces in good working order. For example, providing moisture to road surfaces in appropriate amounts may help bind the road surface and resist wear from traffic. In addition, the disclosed fluid delivery processes may be used to prepare a worksite surface for cutting, grading, compacting, or other construction operations. The disclosed embodiments may also be useful for irrigating or applying chemicals in agricultural applications, or for applying saline solution to roads, runways, parking lots, etc., to melt ice in transportation applications. In addition, the disclosed embodiments may apply to flying machines, such as in crop dusting, fertilizing, insect treatment, or water treatment applications (e.g., to mitigate the risk of forest fires).

Moreover, by determining a fluid delivery rate based on various weather parameters, worksite surface parameters, and worksite operation parameters monitored by a flow control system, fluid may be dispensed only to the extent required to a desired condition (e.g., worksite dust). Accordingly, fluid delivery resources, such as manpower, fuel, and fluid supply, may be conserved. Also, the fluid delivery rate may be controlled ensure safe conditions on the worksite. For example, steep inclines, high-traffic areas, hauling areas, and other problematic areas of the worksite may be delivered less fluid to improve traction. Moreover, fluid delivery may be curtailed or terminated entirely in areas of worksite containing vehicles, worksite personnel, buildings, work areas, etc., as not to disrupt ongoing worksite operations.

Furthermore, although aspects of the present disclosure may be described generally as being stored in memory, one of ordinary skill in the art will appreciate that these aspects can be stored on or read from different types of computer program products or computer-readable storage media. For example, computer programs for implementing the disclosed fluid delivery processes may be stored on and/or read from computer-readable storage media. The computer-readable storage media may store computer-executable instructions which, when executed by a computer, cause the computer to perform, among other things, the disclosed fluid delivery processes. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components fluid delivery system 304 or flow control system 306.

It will be apparent to those skilled in the art that various modifications and variations can be made to the methods and systems of the present disclosure. Other embodiments of the method and system will be apparent to those skilled in the art from consideration of the specification and practice of the method and system disclosed herein. For example, flow control system 306 may take into consideration additional, fewer, or different parameters than those discussed above in determining the fluid delivery rate. Accordingly, it is intended that the specification and examples be considered as exemplary only, with a true scope of the disclosure being indicated by the following claims and their equivalents.

What is claimed is:

1. A method for delivering fluid to a site using a mobile fluid delivery machine, comprising:

determining a location of the mobile fluid delivery machine on the site;

determining, via a flow controller, a fluid delivery rate based on the location of the mobile fluid delivery machine using information related to the site;

delivering, via a fluid delivery system, the fluid to a surface of the site at the location of the mobile fluid delivery machine, at the determined fluid delivery rate; wherein the method further includes:

determining, via the flow controller, whether the mobile fluid delivery machine is within an exclusion zone on the site, and when it is determined that the mobile fluid delivery machine is within the exclusion zone, further determining, via the flow controller, whether the exclusion zone is due to an object on the site or to terrain or a surface feature of the site; and when it is determined that the mobile fluid delivery machine is due to terrain or the surface feature of the site, modifying, via the flow controller, the fluid delivery rate by a predetermined amount; and when it is determined that the exclusion zone is due to the object on the site:

sensing a proximity of the object on a surface of the site to the mobile fluid delivery machine and determining a direction to the sensed object with respect to a heading of the mobile fluid delivery machine;

determining, via the flow controller, at least one of a plurality of spray heads of the mobile fluid delivery machine that does not spray in the determined direction;

selecting, via the flow controller, the at least one of a plurality of spray heads of the mobile fluid delivery machine that does not spray in the determined direction;

modifying, via the flow controller, the fluid delivery rate in response to the sensed object; and delivering, via the fluid delivery system, the fluid to the surface of the site at the modified fluid delivery rate using the selected at least one spray head;

wherein when it is determined that mobile fluid delivery machine is not within an exclusion zone, determining, via the flow controller, whether an override instruction has been received from an operator or a site control facility, and when an override instruction has been received from the operator or the site control facility, reducing, via the flow controller, the fluid delivery rate.

2. The method of claim 1, further including:

determining, via the flow controller, a spray width based on the location of the mobile fluid delivery machine on the site using the information related to the site; and delivering, via the fluid delivery system, the fluid to the worksite surface with the determined spray width.

3. The method of claim 1, further including:

determining, via the flow controller, based on the information related to the site, a value of a site parameter corresponding to the location of the mobile fluid delivery machine; and determining, via the flow controller, the fluid delivery rate based on the value of the site parameter.

4. The method of claim 3, further including:

determining, via the flow controller, based on the information related to the site, a value of a second site parameter corresponding to the location of the mobile fluid delivery machine;

determining, via the flow controller, a first fluid delivery rate component based on the value of the first site parameter;

determining, via the flow controller, a second fluid delivery rate component based on the value of the second site parameter; and determining, via the flow controller, the fluid delivery rate based on the first fluid delivery rate component and the second fluid delivery rate component.

5. The method of claim 3, wherein the site parameter includes at least one of a surface inclination of the site, a type of material composing the surface of the site, a radius of curvature of a road on the site, volume of traffic at the site, a number of traffic incidents at the site, or a loading of vehicles on the site associated with the location of the mobile fluid delivery machine.

6. The method of claim 3, wherein the fluid delivery rate is determined from a predetermined curve mapping values of the site parameter to corresponding fluid delivery rates based on the value of the site parameter.

7. The method of claim 3, wherein the information related to the site comprises a site database containing at least one of surface inclination data, surface composition data, road profile information, traffic incident information, vehicle loading information, exclusion zone information, or solar exposure information indexed according to location on the surface of the site.

8. The method of claim 7, further including:

receiving, via the flow controller, operational information associated with other mobile machines on the site; and updating, via a flow controller, the site database based on the received operational information.

9. A mobile fluid delivery machine for delivering fluid to a site, comprising:

a location device configured to determine a location of the mobile fluid delivery machine on the site;

a site database storing information related to the site;

a flow controller configured to determine a fluid delivery rate based on the location of the mobile fluid delivery machine on the site using the information related to the site;

generate a flow control signal based on the determined fluid delivery rate;

a fluid delivery system including a plurality of spray heads configured to spray the fluid on a surface of the site at the determined fluid delivery rate based on the flow control signal;

a vision device configured to sense an object on the surface of the site;

wherein the flow controller is further configured to:

determining whether the mobile fluid delivery machine is within an exclusion zone on the site, and when it is determined that the mobile fluid delivery machine is within the exclusion zone, further determining whether the exclusion zone is due to an object on the site or to terrain or a surface feature of the site; and when it is determined that the mobile fluid delivery machine is due to terrain or a surface feature of the site, modifying the fluid delivery rate by a predetermined amount; and when it is determined that the exclusion zone is due to an object on the site:

determine a direction to the sensed object with respect to a heading of the mobile fluid delivery machine;

determine at least one of a plurality of spray heads of the mobile fluid delivery machine that does not spray in the determined direction;

select the at least one of the spray heads that does not spray in the determined direction;

modify the fluid delivery rate in response to the sensed object;

generate the flow control signal based on the modified fluid delivery rate and on the selected at least one spray head; and wherein the fluid delivery system is further configured to spray the fluid on the surface of the site at the modified rate using the selected at least one spray head based on the flow control signal; and wherein when it is determined that mobile fluid delivery machine is not within an exclusion zone, the flow controller further determines whether an override instruction has been received from an operator or a site control facility, and when an override instruction has been received from the operator or the site control facility, the flow controller reduces the fluid delivery rate.

10. The mobile fluid delivery machine of claim 9, wherein the flow controller is further configured to:

determine a spray width based on the location of the mobile fluid delivery machine using the information related to the site; and generate the flow control signal based further on the determined spray width, and the fluid delivery system is further configured to spray the fluid on the surface of the site with the determined spray width based on the flow control signal.

11. The mobile fluid delivery machine of claim 9, wherein the flow controller is configured to:

determine, based on the information related to the site, a value of a site parameter corresponding to the location of the mobile fluid delivery machine; and determine the fluid delivery rate based on the value of the site parameter.

12. The mobile fluid delivery machine of claim 11, wherein the flow controller is further configured to:

determine, based on the information related to the site, a value of a second site parameter corresponding to the location of the mobile fluid delivery machine;

determine a first fluid delivery rate component based on the value of the first site parameter;

determine a second fluid delivery rate component based on the value of the second site parameter; and determine the fluid delivery rate based on the first fluid delivery rate component and the second fluid delivery rate component.

13. The mobile fluid delivery machine of claim 11, wherein the site parameter includes at least one of a surface inclination of the site, a type of material composing the surface of the site, a radius of curvature of a road on the site, volume of traffic at the site, a number of traffic incidents at the site, or a loading of vehicles on the site associated with the location of the mobile fluid delivery machine.

14. The mobile fluid delivery machine of claim 11, wherein the site database further includes a predetermined curve mapping values of the site parameter to corresponding fluid delivery rates, and the flow controller is further configured to determine the fluid delivery rate from the curve based on the value of the site parameter.

15. The mobile fluid delivery machine of claim 11, wherein the information related to the site includes at least one of surface inclination data, surface composition data, road profile information, traffic incident information, vehicle loading information, exclusion zone information, or solar exposure information indexed according to location on the surface of the site.

16. The mobile fluid delivery machine of claim 15, wherein the flow controller is further configured to:

receive operational information associated with other mobile machines on the site; and update the site database based on the received information.

17. A method for delivering fluid to a site using a mobile fluid delivery machine, comprising:

receiving a location of the mobile fluid delivery machine on the site;

determining, via a flow controller, a fluid delivery rate based on the location of the mobile fluid delivery machine using information related to the site;

generating, via the flow controller, a flow control signal based on the determined fluid delivery rate;

sending, via the flow controller, the flow control signal to the mobile fluid delivery machine;

wherein the method further includes:

determining, via the flow controller, whether the mobile fluid delivery machine is within an exclusion zone on the site, and when it is determined that the mobile fluid delivery machine is within the exclusion zone, further determining, via the flow controller, whether the exclusion zone is due to an object on the site or to terrain or a surface feature of the site; and when it is determined that the mobile fluid delivery machine is due to terrain or the surface feature of the site, modifying, via the flow controller, the fluid delivery rate by a predetermined amount; and when it is determined that the exclusion zone is due to an object on the site:

receiving an indication of the sensed object in the proximity of the mobile fluid delivery machine;

determining, via the flow controller, a direction to the sensed object with respect to a heading of the mobile fluid delivery machine;

determining, via the flow controller, at least one of a plurality of spray heads of the mobile fluid delivery machine that does not spray in the determined direction;

selecting the at least one of a plurality of spray heads of the mobile fluid delivery machine that does not spray in the determined direction;

modifying, via the flow controller, the fluid delivery rate in response to the sensed object; and generating, via the flow controller, the flow control signal based on the modified fluid delivery and on the selected at least one spray head;

wherein when it is determined that mobile fluid delivery machine is not within an exclusion zone, determining, via the flow controller, whether an override instruction has been received from an operator or a site control facility, and when an override instruction has been received from the operator or the site control facility, reducing, via the flow controller, the fluid delivery rate.

18. The method of claim 17, further including:

determining, via the flow controller, a spray width based on the value of the site parameter; and generating, via the flow controller, the flow control signal based further on the determined spray width.

19. The method of claim 17, further including:

determining, via the flow controller, based on the information related to the site, a value of a site parameter corresponding to the location of the mobile fluid delivery machine; and determining, via the flow controller, the fluid delivery rate based on the value of the site parameter.

20. The method of claim 19, further including:

determining, via the flow controller, based on the information related to the site, a value of a second site parameter corresponding to the location of the mobile fluid delivery machine;

determining, via the flow controller, a first fluid delivery rate component based on the value of the first site parameter;

determining, via the flow controller, a second fluid delivery rate component based on the value of the second site parameter; and determining, via the flow controller, the fluid delivery rate based on the first fluid delivery rate component and the second fluid delivery rate component.

21. The method of claim 19, wherein the site parameter includes at least one of a surface inclination of the site, a type of material composing the surface of the site, a radius of curvature of a road on the site, volume of traffic at the site, a number of traffic incidents at the site, or a loading of vehicles on the site associated with the location of the mobile fluid delivery machine.

22. The method of claim 19, wherein the fluid delivery rate is determined from a predetermined curve mapping values of the site parameter to corresponding fluid delivery rates based on the value of the site parameter.

23. The method of claim 19, wherein the information related to the site comprises a site database containing at least one of surface inclination data, surface composition data, road profile information, traffic incident information, vehicle loading information, exclusion zone information, or solar exposure information indexed according to location on the surface of the site.

24. The method of claim 23, further including:

receiving, via the flow controller, operational information associated with other mobile machines on the site; and updating, via the flow controller, the site database based on the received information.

25. The mobile fluid delivery machine of claim 9, wherein the plurality of spray heads includes a first spray head located toward a front of the mobile fluid delivery machine, a second spray head located to a right and rear of the mobile fluid delivery machine, a third spray head located to a left and the rear of the mobile fluid delivery machine.

26. The mobile fluid delivery machine of claim 9, wherein the flow control signal is further generated based on the relative allocation of an overall fluid delivery rate among each of the selected spray heads, and a desired spray width or distribution of each of the selected spray heads.

27. The mobile fluid delivery machine of claim 9, wherein each spray head of the plurality of spray heads is independently controllable.

* * * * *